United States Patent
McManus et al.

(10) Patent No.: US 9,864,927 B2
(45) Date of Patent: Jan. 9, 2018

(54) METHOD OF DETECTING STRUCTURAL PARTS OF A SCENE

(71) Applicant: Isis Innovation Limited, Oxford, Oxfordshire (GB)

(72) Inventors: Colin Alexander McManus, Oxford (GB); Paul Michael Newman, Oxford (GB); Benjamin Charles Davis, Oxford (GB)

(73) Assignee: Isis Innovation Limited, Oxford, Oxfordshire (GB)

(*) Notice: Subject to any disclaimer, the term of this patent is extended or adjusted under 35 U.S.C. 154(b) by 0 days.

(21) Appl. No.: 14/762,608

(22) PCT Filed: Jan. 20, 2014

(86) PCT No.: PCT/GB2014/050150
§ 371 (c)(1),
(2) Date: Jul. 22, 2015

(87) PCT Pub. No.: WO2014/114923
PCT Pub. Date: Jul. 31, 2014

(65) Prior Publication Data
US 2015/0356357 A1   Dec. 10, 2015

(30) Foreign Application Priority Data
Jan. 24, 2013 (GB) .................................. 1301281.0

(51) Int. Cl.
*G06K 9/00* (2006.01)
*G06K 9/62* (2006.01)
(Continued)

(52) U.S. Cl.
CPC ....... *G06K 9/6202* (2013.01); *G06K 9/00791* (2013.01); *G06T 5/10* (2013.01);
(Continued)

(58) Field of Classification Search
CPC ............ G06K 9/00791; G06K 9/6202; G06K 2009/6213; G06T 7/2053; G06T 5/10;
(Continued)

(56) References Cited

U.S. PATENT DOCUMENTS

2004/0105573 A1   6/2004 Neumann et al.
2004/0201514 A1   10/2004 Stappaerts
(Continued)

FOREIGN PATENT DOCUMENTS

CN   1751249   3/2006
CN   101640788   2/2010
(Continued)

OTHER PUBLICATIONS

Nuske et al. "Robust Outdoor Visual Localization Using a Three-Dimensional-Edge Map." Journal of Field Robotics 26(9), 2009, pp. 728-756.*
(Continued)

*Primary Examiner* — Jon Chang
(74) *Attorney, Agent, or Firm* — Knobbe, Martens, Olson & Bear, LLP

(57) ABSTRACT

A method of detecting the structural elements within a scene sensed by at least one sensor within a locale, the method comprising: a) capturing data from the sensor, which data provides a first representation of the sensed scene at the current time; b) generating a second representation of the sensed scene where the second representation is generated from a prior model of the locale; and c) comparing the first and second representations with one another to determine which parts of the first representation represent structural elements of the locale.

20 Claims, 17 Drawing Sheets

(51) Int. Cl.
*G06T 5/10* (2006.01)
*G06T 7/254* (2017.01)

(52) U.S. Cl.
CPC ...... *G06T 7/254* (2017.01); *G06K 2009/6213* (2013.01); *G06T 2207/10028* (2013.01); *G06T 2207/30252* (2013.01)

(58) Field of Classification Search
CPC . G06T 2207/10028; G06T 2207/30252; G06T 7/254
USPC ........................................................ 382/104
See application file for complete search history.

(56) References Cited

U.S. PATENT DOCUMENTS

| | | | |
|---|---|---|---|
| 2006/0006309 | A1 | 1/2006 | Dimsdale et al. |
| 2007/0247612 | A1 | 10/2007 | Pack et al. |
| 2009/0323121 | A1 | 12/2009 | Valkenburg et al. |
| 2010/0121577 | A1* | 5/2010 | Zhang ................ G06K 9/00805 701/301 |
| 2010/0316257 | A1* | 12/2010 | Xu ...................... G06K 9/00771 382/103 |
| 2010/0329513 | A1 | 12/2010 | Klefenz |
| 2011/0285842 | A1 | 11/2011 | Davenport et al. |
| 2012/0099395 | A1 | 4/2012 | Debrunner et al. |
| 2012/0099400 | A1 | 4/2012 | Debrunner et al. |
| 2012/0162376 | A1 | 6/2012 | Ohtomo et al. |
| 2013/0151444 | A1 | 6/2013 | Blaschko et al. |
| 2015/0379766 | A1 | 12/2015 | Newman et al. |
| 2017/0076455 | A1 | 3/2017 | Newman et al. |

FOREIGN PATENT DOCUMENTS

| | | |
|---|---|---|
| EP | 0 911 647 | 4/1999 |
| EP | 1 517 158 | 3/2005 |
| GB | 2 411 532 | 8/2005 |
| GB | 2 434 269 | 7/2007 |
| JP | H08-315125 | 11/1996 |
| JP | 2012-154863 | 8/2012 |
| WO | WO 01/69171 | 9/2001 |
| WO | WO 2004/042662 | 5/2004 |
| WO | WO 2005/054799 | 6/2005 |
| WO | WO 2007/030026 | 3/2007 |
| WO | WO 2007/094765 | 8/2007 |
| WO | WO 2009/061174 | 5/2009 |
| WO | WO 2011/120141 | 10/2011 |
| WO | WO 2011/152841 | 12/2011 |
| WO | WO 2012/134419 | 10/2012 |
| WO | WO 2014/128498 | 8/2014 |
| WO | WO 2015/181561 | 12/2015 |

OTHER PUBLICATIONS

Cappelle et al., "Virtual 3D City Model for Navigation in Urban Areas", *J Intell Robot Syst*, 2012, vol. 66, pp. 377-399.
Churchill et al., "Practice makes perfect? Managing and leveraging visual experiences for lifelong navigation", *Robotics and automation (ICRA)*, May 14, 2012, pp. 4525-4532.
Damen et al, "Egocentric Real-time Workspace Monitoring using an RGB-D camera", *Intelligent Robots and Systems (IROS), IEEE/RSJ International Conference*, Oct. 7, 2012, pp. 1029-1036.
Geiger, A., "Monocular road mosaicking for urban environments", *Intelligent Vehicles Symposium*, Jun. 3, 2009, pp. 140-145.
Kosecka, Jana, "Detecting Changes in Images of Street Scenes", *Computer Vision ACCV*, Nov. 5, 2012, vol. 7727, pp. 590-601.
Lobo et al., "Bayesian 3D Independent Motion Segmentation with IMU-aided RBG-D Sensor", *IEEE Int Conf on on Multisensor Fusion and Integration for Intelligent Systems (MFI)*, Sep. 13-15, 2012, pp. 445-450.
McManus et al., "Distraction suppression for vision-based pose estimation at city scales", *IEEE Int Conf on Robotics and Automation (ICRA)*, May 6-10, 2013, pp. 3762-3769.
Schiller et al., "Improved Video Segmentation by Adaptive Combination of Depth Keying and Mixture-of-Gaussians", *Field Programmable Logic and Application*, Jan. 1, 2011.
Taneja et al., "Image Based Detection of Geometric Changes in Urban Environments", *IEEE Int Conf on Computer Vision*, Jun. 11, 2011, pp. 2336-2343.
Wang et al., "What could move? Finding cars, pedestrians and bicyclists in 3D laser data", *IEEE Int Conf on Robotics and Automation (ICRA)*, May 14, 2012, pp. 4038-4044.
International Search Report issued in PCT Application No. PCT/GB2014/050150, dated Jun. 12, 2014, in 4 pages.
Search Report issued in GB Application No. 1301281.0, dated Jul. 12, 2013, in 3 pages.
Harrison et al., "TICSync: Knowing When Things Happened", *IEEE International Conference on Robotics and Automation*, 2011, pp. 356-343.
Abdel-Hakim et al., CSIFT: A SIFT Descriptor with Color Invariant Characteristics, Proceedings of the 2006 IEEE Computer Society Conference on Computer Vision and Pattern Recognition, 2006, in 6 pages.
Baldwin et al., "Road vehicle localization with 2D push-broom LIDAR and 3D priors", Robotics and Automation (ICRA), 2012 IEEE International Conference, 2012, pp. 2611-2617.
Barnard et al., "A Comparison of Computational Color Constancy Algorithms—Part I: Methodology and Experiments With Synthesized Data", IEEE Transaction on Image Processing, Sep. 9, 2002, vol. 11, No. 9, pp. 972-983.
Bay et al., "SURF: Speeded Up Robust Features", Computer Vision—ECCV 2006, 2006, pp. 404-417.
Behle, "Binary Decision Diagrams and Integer Programming", Doctoral Thesis, Universitat des Saarlandes, 2007, pp. 1-98.
Borges et al., "Vision-based Localization Using an Edge Map Extracted from 3D Laser Range Data", 2010 IEEE International Conference on Robotics and Automation, May 3-8, 2010, in 8 pages.
Calonder et al., "BRIEF: Binary Robust Independent Elementary Features", Computer Vision—ECCV 2010, 2010, in 14 pages.
Calonder et al., "BRIEF: Computing a local binary descriptor very fast", IEEE Transactions on Pattern Analysis and Machine Intelligence, 2012, vol. 34, No. 7, in 29 pages.
Corke et al., "Dealing with shadows: Capturing Intrinsic Scene Appearance for Image-based Outdoor Localisation", 2013 IEEE/RSJ International Conference on Intelligent Robots and Systems, Nov. 3, 2013, pp. 2085-2092.
Cummins et al., "Appearance-only SLAM at large scale with FAB-MAP 2.0", The International Journal of Robotics Research, Nov. 12, 2010, in 25 pages.
Davison et al., "MonoSLAM: Real-Time Single Camera SLAM", IEEE Transactions on Pattern Analysis and Machine Intelligence, Jun. 2007, vol. 29, No. 6, in 16 pages.
Finlayson et al., "Color constancy at a pixel", JOSA A, 2001, vol. 18, No. 2, in 28 pages.
Finlayson et al., "Intrinsic Images by Entropy Minimization", Computer Vision—ECCV, 2004, pp. 582-595.
Finlayson et al., "On the Removal of Shadows From Images", Pattern Analysis and Machine Intelligence, IEEE Transactions, 2006, vol. 28, No. 1.
Fischler et al., "Random Sample Consensus: A Paradigm for Model Fitting with Applications to Image Analysis and Automated Cartography", Communications of the ACM, Jun. 1981, vol. 24, No. 6, pp. 381-395.
Foster, David H., "Color constancy", Vision Research, 2011, vol. 51, pp. 674-700.
Furgale et al., "Visual teach and repeat for long-range rover autonomy", Journal of Field Robotics, Sep. 1, 2010, vol. 27, No. 5, pp. 534-560.
Geiger et al., "Are we ready for Autonomous Driving? The KITTI Vision Benchmark Suite", Computer Vision and Pattern Recognition (CVPR), 2012 IEEE Conference, 2012, pp. 3354-3361.
Glover et al., "FAB-MAP + RatSLAM: Appearance-based SLAM for Multiple Times of Day", 2010 IEEE International Conference on Robotics and Automation Anchorage Convention District, May 3-8, 2010, in 6 pages.

(56) References Cited

OTHER PUBLICATIONS

Grasshopper 2 GS2-FW, Technical Reference Manual, Point Grey, 2011, in 171 pages.
Guo et al., "Single-Image Shadow Detection and Removal using Paired Regions", Computer Vision and Pattern Recognition (CVPR), 2011 IEEE Conference, 2011, pp. 2033-2040.
Ho et al., "Detecting Loop Closure with Scene Sequences", International Journal of Computer Vision, Jan. 2007, vol. 74, No. 3, pp. 261-286.
Jegou et al., "Hamming embedding and weak geometric consistency for large scale image search", Computer Vision—ECCV, 2008, in 16 pages.
Kwatra et al., "Shadow Removal for Aerial Imagery by Information Theoretic Intrinsic Image Analysis", Computational Photography (ICCP), 2012 IEEE International Conference, 2012, pp. 1-8.
Lowe, David G., "Object Recognition from Local Scale-Invariant Features", The proceedings of the seventh IEEE international conference, 1999, vol. 2.
Maddern et al., "LAPS-II: Using Illumination Invariance for 6-DoF Day and Night Localisation with Monocular Cameras", in 8 pages.
Maddern et al., "Towards Robust Night and Day Place Recognition using Visible and Thermal Imaging", RSS 2012: Beyond laser and vision: Alternative sensing techniques for robotic perception, 2012, in 7 pages.
McManus et al., "Shady Dealings: Robust, Long-Term Visual Localisation using Illumination Invariance", in 6 pages.
McManus et al., "Visual Teach and Repeat Using Appearance-Based Lidar", Proceedings of IEEE International Conference on Robotics and Automation (ICRA), 2011, in 8 pages.
Milford et al., "SeqSLAM: Visual Route-Based Navigation for Sunny Summer Days and Stormy Winter Nights", Proceedings of the IEEE International Conference on Robotics and Automation (ICRA), May 14-18, 2012, in 7 pages.
Napier et al., "Cross-Calibration of Push-Broom 2D LIDARs and Cameras in Natural Scenes", Proceedings of 2013 IEEE International Conference on Robotics and Automation, 2013, in 6 pages.
Nocedal et al., "Numerical Optimization, Second Edition", 2000, in 683 pages.
Nuske et al., "Extending the Dynamic Range of Robotic Vision", Proceeding of the 2006 IEEE International Conference on Robotics and Automation, May 2006, in 6 pages.
Nuske et al., "Robust Outdoor Visual Localization Using a Three-Dimensional-Edge Map", Journal of Field Robotics, 2009, vol. 26, No. 9, pp. 728-756.
Ranganathan et al., "Towards illumination invariance for visual localization", Robotics and Automation (ICRA), 2013 IEEE International Conference, 2013, in 8 pages.
Ratnasingam et al., "Chromaticity Space for Illuminant Invariant Recognition", IEEE Transactions on Image Processing, Aug. 2012, vol. 21, No. 8, pp. 3612-3623.
Ratnasingam et al., "Study of the photodetector characteristics of a camera for color constancy in natural scenes", J. Opt. Soc. Am. A, Feb. 2010, vol. 27, No. 2, pp. 286-294.
Rosten et al., "Real time video annotations for augmented reality", Advances in Visual Computing, 2005, in 33 pages.
Shang, Global Search Methods for Solving Nonlinear Optimization Problems, Doctoral Thesis, University of Science and Technology of China, 1997, pp. 1-307.
Stewart et al., "LAPS—Localisation using Appearance of Prior Structure: 6-DoF Monocular Camera Localisation using Prior Pointclouds", Robotics and Automation (ICRA), 2012 IEEE International Conference, 2012, in 8 pages.
Sunderhauf et al., "Are We There Yet? Challenging SeqSLAM on a 3000 km Journey Across All Four Seasons", Workshop on Long-Term Autonomy, IEEE International Conference on Robotics and Automation (ICRA), 2013, in 3 pages.
Valgren et al., "SIFT, SURF and Season: Long-term Outdoor Localization Using Local Features", EMCR, 2007, in 6 pages.
Zhang et al., "Robust Appearance Based Visual Route Following for Navigation in Large-scale Outdoor Environments", The International Journal of Robotics Research, Mar. 1, 2009, vol. 28, No. 3, pp. 331-356.
Zhu et al., "Learning to Recognize Shadows in Monochromatic Natural Images", Computer Vision and Pattern Recognition (CVPR), 2010 IEEE Conference, 2010, in 8 pages.

* cited by examiner

METHOD OF DETECTING STRUCTURAL PARTS OF A SCENE

This invention relates to processing data representing a sensed scene in order to detect structural parts of the scene. In particular, the method may relate to a sensed scene proximal to a vehicle. Particularly, but not exclusively, the method may relate to a method of localising a vehicle within the sensed scene. In particular, and again not exclusively, the localisation of a vehicle within a sensed scene may be useful in autonomous navigation systems.

It is convenient to describe the background to embodiments of this invention by referring to autonomous navigation systems but there may be embodiments in other fields. It is conceivable that other embodiments may relate to any of the following fields: surveillance systems which may be arranged to detect object in a scene detection, smartphone applications; surveying applications which may be arranged to detect change in a previous survey.

However, in an autonomous navigation system, a changing environment presents a challenge as scene motion (i.e. change) can degrade standard outlier rejection schemes and result in erroneous motion estimates and therefore cause problems for navigation systems relying on an analysis of the changing environment.

One prior art approach has been to use a trained detector and tracking system. However, such systems can be problematic as they require a great deal of time to train, are challenging to implement, and require knowledge of all of the various distraction classes (i.e. types of object likely to be observed) which in a real-world environment can be numerous.

In the area of road-vehicle navigation, leveraging prior surveys to improve motion estimation is a common approach. Numerous techniques exist for both vision and laser scanning, and include:
  (i) combining vision with aerial images, synthetic overhead images, or prior visual experiences;
  (ii) combining 2D laser rangefinders with 2D priors;
  (iii) combining 2D laser rangefinders with 3D priors;
  (iv) combining 3D laser rangefinders with 3D priors; and
  (v) combining vision with 3D priors.

In another document, "Image based detection of geometric changes in urban environments" published at the 2011 IEEE International conference on Computer Vision (A. Taneja, L. Ballan, and M. Pollefeys), a method of detecting changes in the geometry of an urban environment by observing images of the environments current state is taught. The proposed method can be used to optimize the process of updating the 3D model of a city changing over time, by restricting this process to only those areas where changes are detected.

According to a first aspect of the invention there is provided a method of detecting the structural elements within a scene sensed by at least one sensor within a locale, the method may comprise at least one of the following features:
  a) capturing data from the sensor, which data provides a first representation of the sensed scene at the current time;
  b) generating a second representation of the sensed scene where the second representation is generated from a prior model of the locale; and
  c) comparing the first and second representations with one another to determine which parts of the first representation represent structural elements of the locale.

Embodiments providing such a method can prove useful because knowing which parts of the sensed scene are structural (as opposed to ephemeral) may prove useful in further localisation of the vehicle or other uses. Embodiments which provide a prior model provide a convenient way to provide a comparison which is efficient to compute and yet sufficiently accurate to compare with the first representation.

Changing parts of the scene may be thought of as being ephemeral or foreground parts of the scene. Non-changing parts of the scene may be thought of as being a structural part of the scene or a background part of the scene.

In some embodiments, step b further includes the step of generating the second representation by reprojecting at least a portion of the prior model to represent the first representation. Here reprojecting may be thought of as generating or otherwise creating the second representation from the prior model.

Some embodiments may process the prior model so that the second representation includes only structural features and substantially excludes ephemeral objects. Such embodiments are advantageous in that the amount of processing to determine the structural elements may be reduced.

The method, in some embodiments, may include the step of generating differences, which may be disparity differences, between the first and second representations which are weighted according to an associated measurement uncertainty.

Conveniently, the measurement uncertainty is provided by using a pre-computed filter.

Some embodiments, may implement the pre-computed filter as an average depth-Jacobian image where $\partial z^s/\partial x$ is computed for each pixel in the following:

$$Z_x := \sqrt{\left(\frac{\partial z^s}{\partial x}\right) P_x \left(\frac{\partial z^s}{\partial x}\right)^T}$$

Embodiments using such a pre-computed filter are advantageous due to the reduction in processing that occurs. At least some of the embodiments may implement the method in real time (which may for example be used to allow the method to be used to navigate a vehicle, etc.). Accordingly, reducing the processing to a point to where it can be achieved in so-called real time is advantageous for such embodiments.

Embodiments, may compute the average depth Jacobian image over a plurality of frames and the results combined. The combination may be by way of averaging or the like.

Step b may generate the second representation using a determination of the movement between the time first representation was captured and the scene provided by the prior model.

Conveniently, the determined movement is scaled by an expected depth, typically such that features at greater depth within the representations have the weighting increased.

Embodiments may provide a method of localising a vehicle within it locale comprising applying the method of the first aspect of the invention, which method may be applied to data generated from a sensor of the vehicle.

According to a second aspect of the invention there is provided a system arranged to detect structural elements within a sensed scene, wherein the system is arranged to perform at least one of the following tasks:
  a) acquire a first representation of a scene taken at a first time;

b) generate a second representation of the sensed scene, where the second representation is generated from a prior model of a locale containing the sensed scene; and
c) compare the first and second representations with one another to determine which parts of the first representation are used to determine structural elements of the locale.

According to a third aspect of the invention there is provided a machine readable medium containing instructions which when read by a computer cause that computer to perform at least one of the following steps:
a) acquire a first representation of a scene taken at a first time;
b) generate a second representation of the sensed scene, where the second representation is generated from a prior model of a locale containing the sensed scene; and
c) compare the first and second representations with one another to determine which parts of the first representation are used to determine structural elements of the locale.

The machine readable medium referred to in any of the above aspects of the invention may be any of the following: a CDROM; a DVD ROM/RAM (including –R/–RW or +R/+RW); a hard drive; a memory (including a USB drive; an SC card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

There now follows, by way of example only and with reference to the accompanying figures, a detailed description of embodiments of the present invention of which:

FIG. 4b shows a 3D scene prior coloured with corresponding laser intensity values, where the 3D scene prior largely corresponds to the reference scene of FIG. 4a;

FIG. 4c shows a reprojected laser-intensity image (a second representation) at the estimated camera pose in the scene prior of FIG. 4a;

FIG. 5d shows a disparity difference image (the absolute value of the differences between images 5b and 5c);

FIG. 8b shows a true optical flow generated by the scene shown in FIG. 8a;

Whilst it is convenient to describe embodiments in relation to a vehicle which is arranged to process its locale, embodiments of the invention may find wider applicability. The ability to determine which parts of a scene are ephemeral and/or which parts relate to structural elements (i.e. to differentiate background from foreground) may find applicability in a number of other fields. For example embodiments may find utility in surveillance systems perhaps to aid object detection, smartphone applications; surveying applications interested in change detection (e.g., maybe returning to a pre-surveyed environment to see if any infrastructure has changed).

Figure 12:
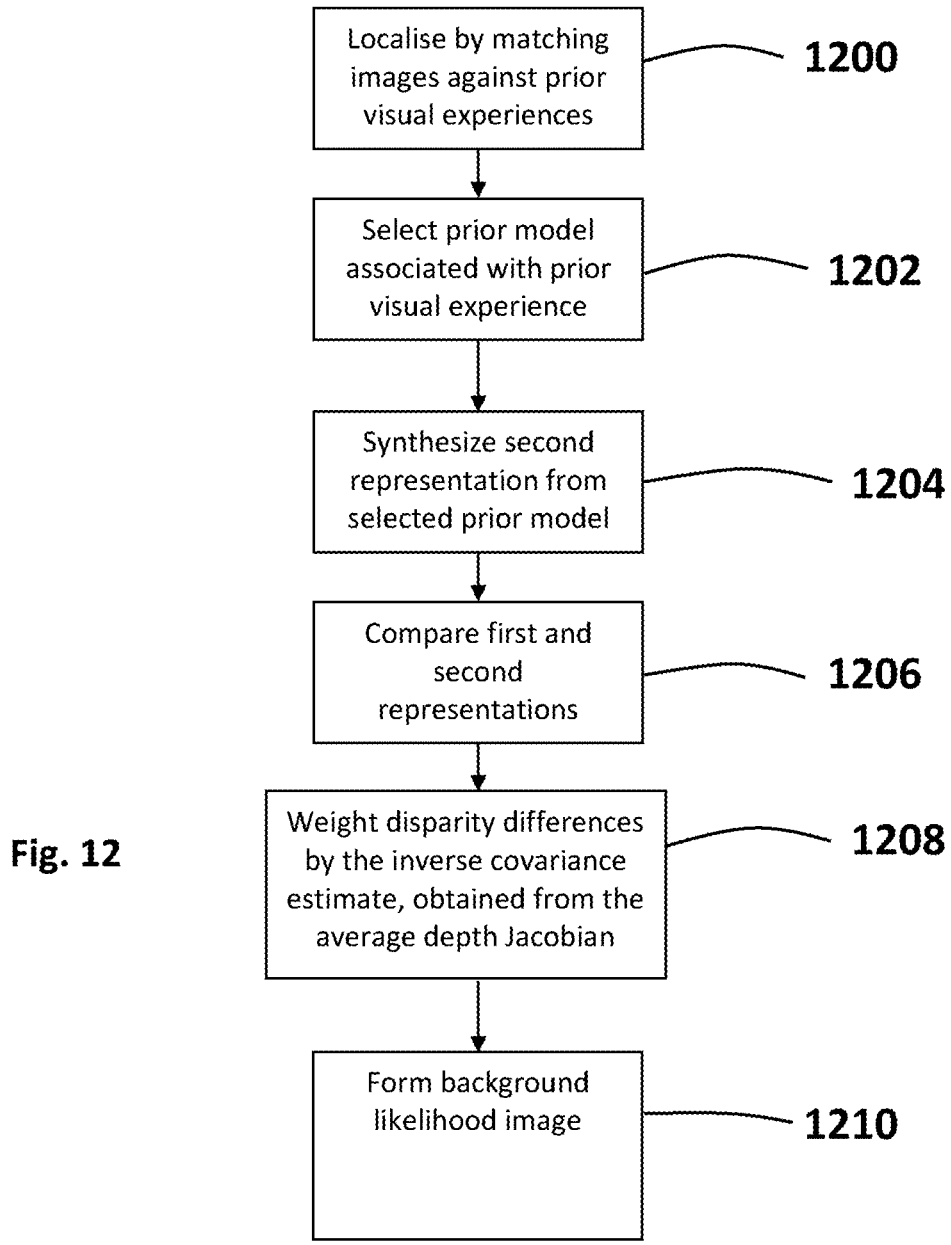
FIG. 12 shows a flow chart outlining steps of an embodiment.
Figure 13:
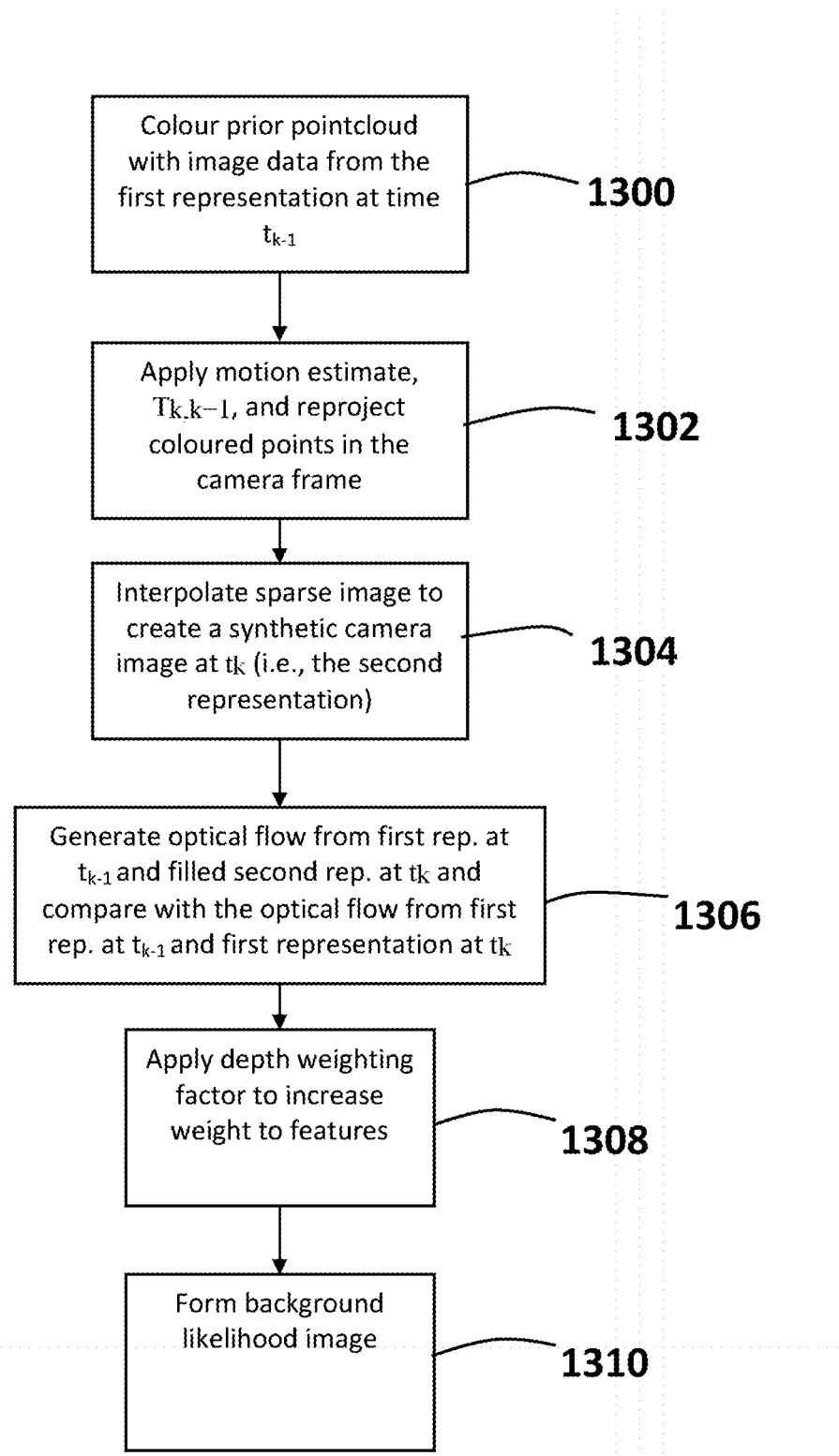
FIG. 13 shows a flow chart outlining steps of a further embodiment.

Thus, embodiments of the invention are described in relation to a sensor 100 mounted upon a vehicle 102 and in relation to the flow chart of FIGS. 12 and 13. The sensor 100 is arranged to monitor its locale and generate data based upon the monitoring thereby providing data giving a first representation of a sensed scene around the vehicle. In the embodiment being described, because the sensor is mounted upon a vehicle 102 then the sensor 100 is also arranged to monitor the locale of the vehicle.

In the embodiment being described, the sensor 100 is a passive sensor (i.e. it does not create radiation and merely detects radiation) and in particular is a stereoscopic camera (such as the PointGrey BumbleBee); it comprises two cameras 104, 106. The skilled person will appreciate that such a sensor could be provided by two separate cameras rather than as a single sensor 100.

In other embodiments, the sensor 100 may comprise other forms of sensor such as a laser scanner or the like. As such, the sensor 100 may also be an active sensor arranged to send radiation out therefrom and detect reflected radiation.

In some embodiments, it is conceivable that the vehicle 102 also comprises a second sensor 103, which in the embodiment being described is a laser scanner, such as a scanning-LIDAR sensor (the SICK LMS-151). Other laser sensors, such as those produced by Velodyne, may also be used. The second sensor is used to generate prior data providing a prior model from which data a second representation of the sensed scene can be generated; thus, the second representation may be thought of as a synthetic representation of the locale. However, in other embodiments the second sensor may not be provided on the same vehicle as the first sensor 100 and prior data may be collected and stored, as a prior model, for use on the vehicle 102.

Figure 1:
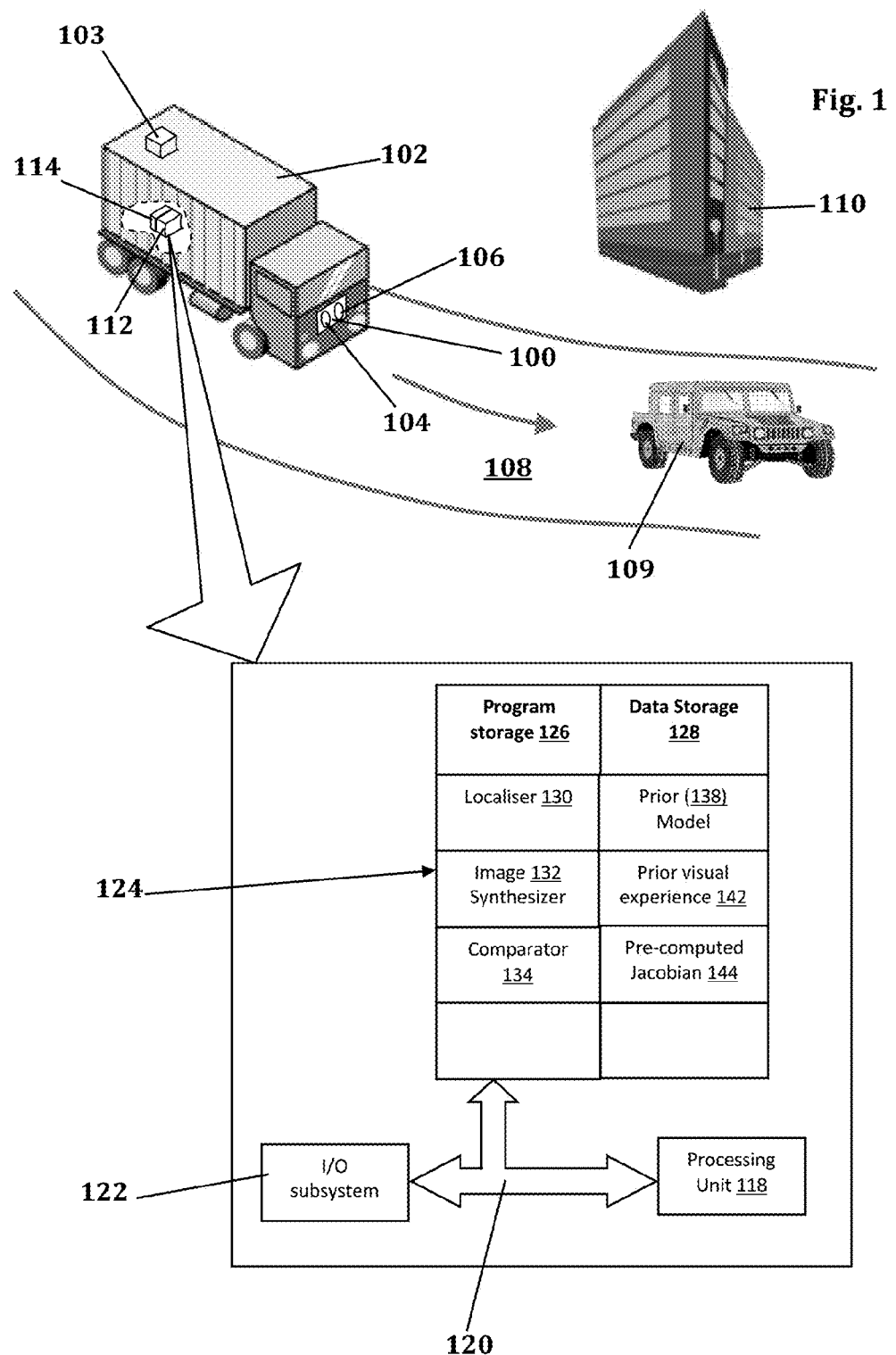
FIG. 1 is a schematic view of a vehicle utilising an embodiment to locate the vehicle relative to its locale.

In the embodiment shown in FIG. 1, the vehicle 102 is travelling along a road 108 and the sensor 100 is imaging the locale (e.g. the building 110, road 108, car 109, etc.) as the vehicle 102 travels. In this embodiment, the vehicle 102 also comprise processing circuitry 112 arranged to capture data from the sensors 100, 103 and subsequently to process the data (in this case images) generated by the sensors 100, 103. In particular, the processing circuitry captures data from the sensor 100 which data provides a sensed scene from around the vehicle at a current time and as the vehicle 102 moves the sensed scene changes. In the embodiment being described, the processing circuitry 112 also comprises, or has access to, a storage device 114 on the vehicle.

Within the sensed scene, some of the objects remain static (i.e. do not move or change other than changes in lighting, etc) and an example of such a static image within FIG. 1 would be the building 110. Such static parts of the scene may be thought of as being structural parts of the scene. Other objects are not static, are not fixed relative to the sensed scene and may not be there should the locale be revisited in the future and such objects may be referred to as ephemeral objects. An example of such an ephemeral object in FIG. 1 would be the car 109. Embodiments of the invention may also be arranged to determine changes to the structural elements between first and second times, such as during surveys of an area over a period of time.

Figure 2A:
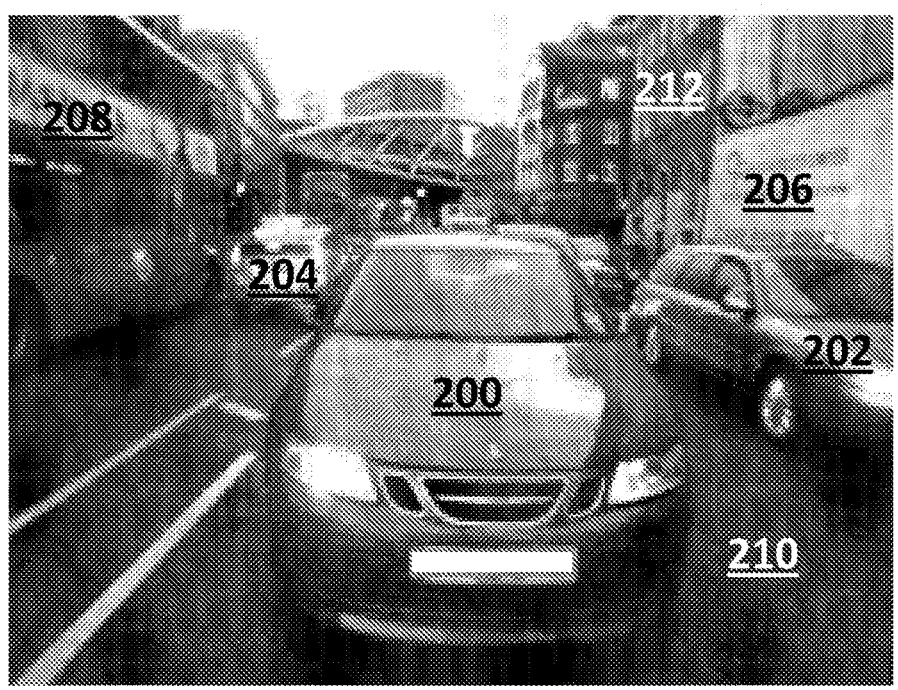
FIG. 2a shows a scene in which large parts are occupied by dynamic objects, which can distract and impede egomotion estimation and obscure structural parts of the scene.
Figure 2B:
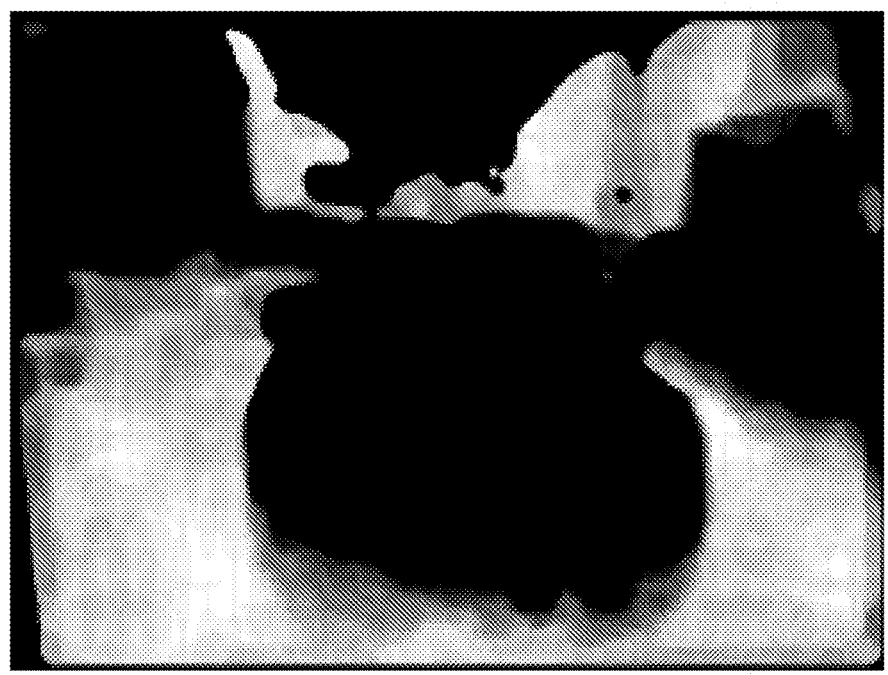
FIG. 2b shows the scene of FIG. 2a which has been processed by an embodiment which use knowledge of prior 3D structure to generate a probability mask that indicates which regions in the scene are likely to belong to the structural elements (white) and which parts relate to ephemeral objects (black)

Looking at FIG. 2a, which shows an example sensed scene, which may be thought of as a first representation of the scene, from one of the cameras (e.g. 104) of the sensor 100 and it can be seen that the majority of the image represents ephemeral objects such as the car 200, 202, 204, etc; the lorry 206 and the bus 208. Thus, the structural parts of the image (such as the road 210 and buildings e.g. 212) are heavily obscured by the ephemeral objects.

Returning to FIG. 1 then it can be seen that the lower portion of the Figure shows components that may be found in a typical processing circuitry 112. A processing unit 118 may be provided which may be an Intel® X86 processor such as an I5, I7 processor or the like. The processing unit 118 is arranged to communicate, via a system bus 120, with an I/O subsystem 122 (and thereby with external networks, displays, and the like) and a memory 124.

The skilled person will appreciate that memory 124 may be provided by a variety of components including a volatile memory, a hard drive, a non-volatile memory, etc. Indeed, the memory 124 comprise a plurality of components under the control of, or at least accessible by, the processing unit 118.

However, typically the memory 124 provides a program storage portion 126 arranged to store program code which when executed performs an action and a data storage portion 128 which can be used to store data either temporarily and/or permanently.

In other embodiments at least a portion of the processing circuitry 112 may be provided remotely from the vehicle. As such, it is conceivable that processing of the data generated by the sensor 100 is performed off the vehicle 102 or a partially on and partially off the vehicle 102. In embodiments in which the processing circuitry is provided both on and off the vehicle then a network connection (such as a 3G UMTS (Universal Mobile Telecommunication System) or WiFi (IEEE 802.11) or like).

In the embodiment shown, the program storage portion 126 comprises a localiser 130 arranged to localise the vehicle 102 (i.e. to provide a co-ordinate reference identifying the location of the vehicle); an image synthesizer 132 arranged to synthesize images; and a comparator 134 arranged to compare images. The data storage portion of the memory 128 comprises one or more sets of data each including a prior representation; one or more prior visual experiences 142 used by the localiser 130; and a pre-computed Jacobian 144 used to filter images.

It is convenient to refer to a vehicle travelling along a road, or may be off-road, or the like, but the skilled person will appreciate that embodiments need not be limited to land vehicles and could be water borne vessels such as ships, boats or the like or indeed air borne vessels such as airplanes, or the like. Likewise, it is convenient in the following description to refer to image data generated by cameras 104, 106 but other embodiments may generate other types of the data. In particular embodiments may utilise stereo cameras; monocular cameras; laser scanners (such as LIDAR); or sensors that are capable of generating data containing depth information.

The sensor 100, together with the processing circuitry 112 to which the sensor 100 is connected, together with the software running on the processing circuitry 112 form what is often termed a Visual Odometry (VO) system. In the embodiment being described, the VO system continuously produces a (possibly ephemeral—i.e. containing ephemeral objects) 3D model of the world using the data generated from the cameras (104, 106). Typically, the VO system locates points (which may be referred to as nodes) within each image from the camera pair which can be located in both images of the stereo pair). These points are then tracked between subsequent images (i.e. between a first time and a second time) to generate a trajectory of the sensor 100. Since the location of the sensor 100 relative to the vehicle is known then it is possible to also calculate, perhaps using the processing circuitry 112, the trajectory of the vehicle 102.

In contrast to the prior art, such as trained detector systems, embodiments described herein do not detect objects per se (although object detection could conceivably be performed in addition) but rather determine what may be thought of the as the relevance of objects within the sensed scene. This may be though as what should be focused on within the sensed scene.

Embodiments described herein rely on a prior model of the sensed scene. In the embodiment being described this prior model is generated using a prior scan of the environment using the laser scanner 103 as the sensor to make the survey together with the output of a VO system.

Figure 3:
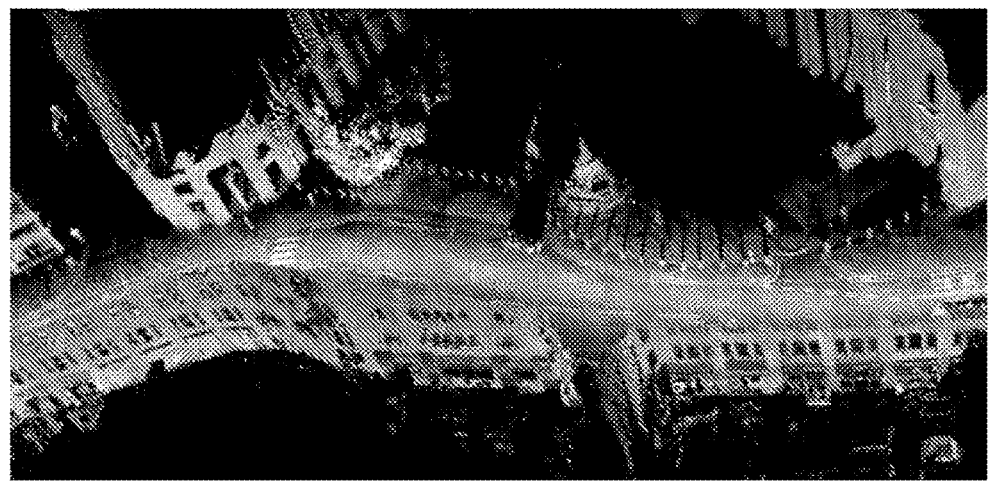
FIG. 3 shows a laser generated 3D point cloud collected with a mobile sensing suite mounted on a commercial vehicle, equipped with a stereo camera, planar laser rangefinder, and GPS.

Embodiments may use a LIDAR sensor together with the output of the VO system to generate a 3D point cloud as illustrated in FIG. 3. The techniques used to generate such a point are briefly outlined below. Thus, the 3D point cloud may be thought of as being a prior model of the locale.

Other embodiments may use techniques of generating the prior model other than a LIDAR/VO combination.

In order to fuse the data output from each of the first 100 and second 103 sensors the trajectory of the vehicle (such as for example as output by the VO system) is used and the LIDAR data (i.e. output from the second sensor 103) is retrospectively compared with the camera data (i.e. output from the first sensor). This retrospective comparison of the LIDAR and camera data uses the fact that the vehicle 102 motion causes an overlap of the respective fields of the sensors 100, 103 if such an overlap did not occur already.

Embodiments construct a swathe using a base trajectory estimate, $X^b(t)$, obtained using the trajectory generated by the VO and the putative calibration $^bT_1$ between the base trajectory and the LIDAR 1. Other embodiments may generate the trajectory from other sensor systems such as from an Inertial Navigation System (INS).

The swathe is then projected into the camera using a calibration between the camera c and base trajectory $^bT_c$. An interpolated LIDAR reflectance image is then generated.

Thus, the embodiment being described relies on using vision sensors (i.e. the cameras 104, 106) in conjunction with a prior 3D survey (i.e. a prior model) generated from a laser scanner 103. The skilled person will appreciate that whilst the laser scanner 103 is shown on the same vehicle 102, the prior representation of the scene may be generated by another vehicle.

In particular therefore, embodiments use a prior model of the scene generated by a survey vehicle equipped with 3D laser sensors 103, cameras, and an Inertial Navigation System INS (which in one embodiment is an Oxford Technical Solutions (OxTS) RT-3042 Inertial Navigation System (INS) for groundtruth). More specifically, the embodiment being described uses a prior model provided by a 3D point-cloud in conjunction with stereo imagery generated from the sensor 100 (ie the VO system). An example a prior model of the environment, and in particular of a 3D point cloud, is shown in FIG. 3.

At least some of the embodiments process the data collected in the survey to generate a prior model which is free, or at least substantially free, of ephemeral objects. Processing of the data collected to remove ephemeral objects to produce the prior model is described in D. Wang, I. Posner, and P. Newman, "What could move? finding cars, pedestrians and bicyclists in 3d laser data," in *Proceedings of the IEEE International Conference on Robotics and Automation*, Saint Paul, Minn., USA, May 14-18, 2012 and embodiments may use a similar method.

Thus, it will be seen that FIG. 3 is free from vehicles or other ephemeral objects and is largely composed of structural features of the scene (e.g. roads, buildings, trees, or the like).

At a high-level, a first embodiment may be described as follows: At runtime, the localiser 130 provided by the processing circuitry is arranged to match live stereo images, generated by the sensor 100, against prior visual experiences 142 (step 1200) using, in the embodiment being described, an Experience-Based Navigation (EBN) system in order to localise the vehicle 102 in its surroundings. EBN is described in the patent application GB1202344.6 an also in "Practice makes perfect? Managing and leveraging visual experiences for lifelong navigation 2012 IEEE International Conference on Robotics and Automation (ICRA), 14-18 May 2012 each of which is hereby incorporated by reference and the skilled person is directed to read the contents. Such matching allows the current position of the vehicle 102 to be localised within the previous experiences of the (or another) vehicle such that the current location of the vehicle is determined. Typically, the localisation of the vehicle is performed such that the lateral position is determined to have an error of less than substantially 2 meters. In some embodiments, the lateral positional error is less than substantially 1 m. Further the positional error in the localisation may be less than substantially 10 degrees. Such accuracies may more readily be obtained by embodiments using VO systems than other sensor technologies such as GPS and the like.

The EBN provides a transformation estimate against a prior visual experience (recall that one of the requirements for the prior representation 138 (i.e. a prior model) is that it has an associated image sequence). Table I below provides the system parameters used in our experiments, corresponding to the notation introduced below.

Other systems may use other means to localise within the available prior representations available.

For example, other embodiments may use prior data in the form of street-view images (such as GOOGLE®) and a use a place-recognition system that queries a database of images to find the prior image, or a set of candidate prior images, that best matches the queried image. Then, the position and orientation is estimated using standard computer-vision techniques (e.g., estimating the Essential matrix).

Embodiments using EBN are believed advantageous because they can more naturally handle sudden or gradual appearance changes such as due to changing weather conditions, lighting or seasons.

Each prior visual experience 142 has an associated 3D point-cloud (i.e. a prior model 138) and the localiser 130 is arranged to select the prior model corresponding to the selected prior visual experience for further processing (step 1202).

Once the vehicle 102 has been localised within a prior model 138 the image synthesizer is arranged to synthesise depth images (which may be thought of as a second representations) from estimated camera poses in this 3D model (step 1204). These synthetic depth images (second representations) are then used, by a comparator 134, to compare the current structure of the scene (given by the output from the sensor 100; i.e. the first representation) with the static structure of scene (given by the prior and associated synthesized image; i.e. the second representation) to identify large discrepancies (step 1206). This comparison provides a clean segmentation of the image into foreground and background elements, without the need for an object detection system.

Thus, describing the first embodiment in more detail, the pose of the vehicle 102 is generated by the localiser 130. In the embodiment being described, this is performed by the EBN which is arranged to provide an estimated pose of the vehicle, denoted by a 6×1 column vector x, within the 3D scene model.

Figure 4A:
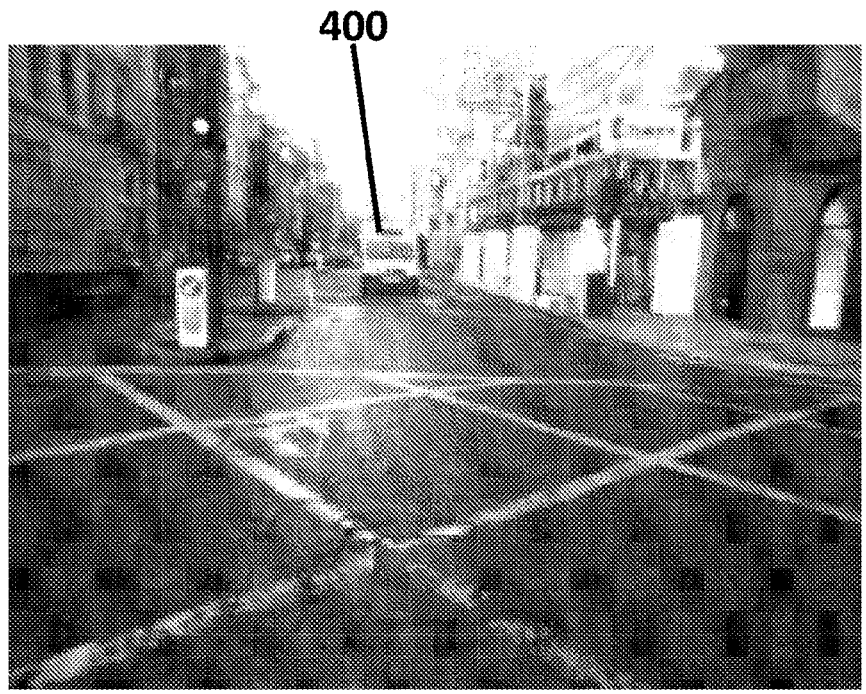
FIG. 4a shows a camera image of a scene which is used by an embodiment as a reference scene.
Figure 4B:
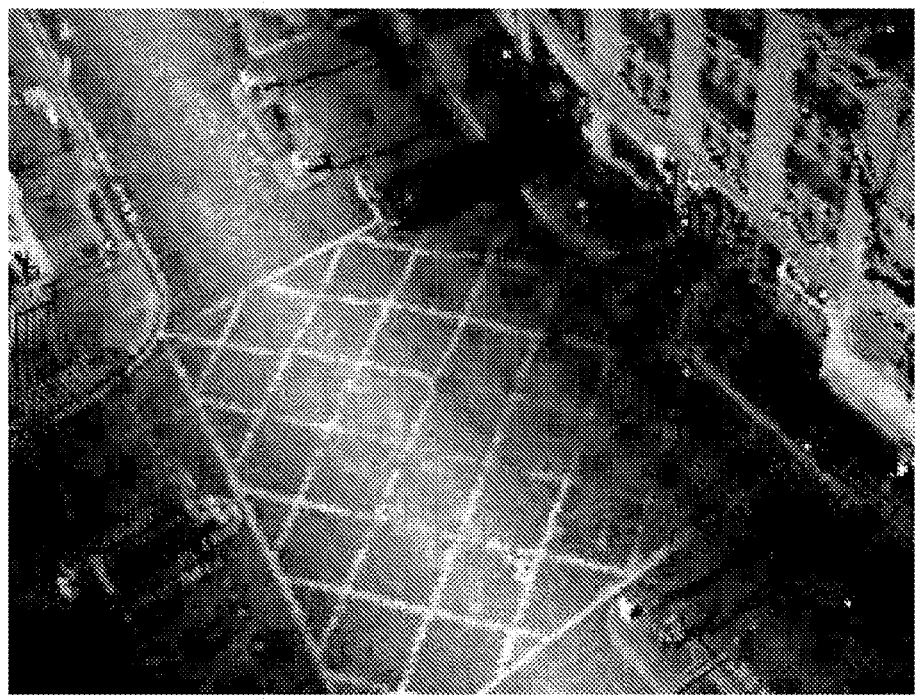
Figure 4C:
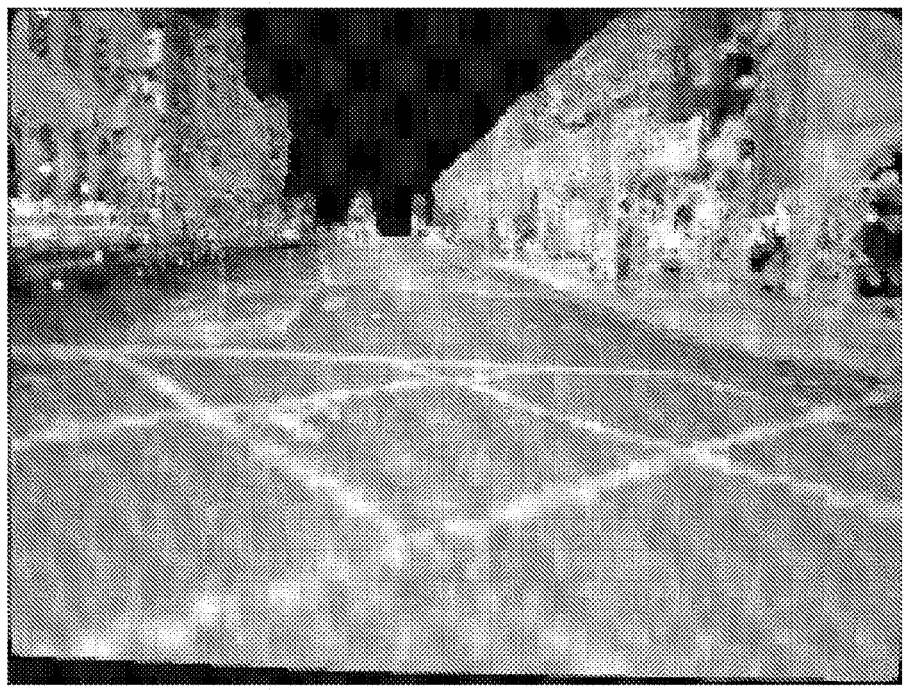
Figure 4D:
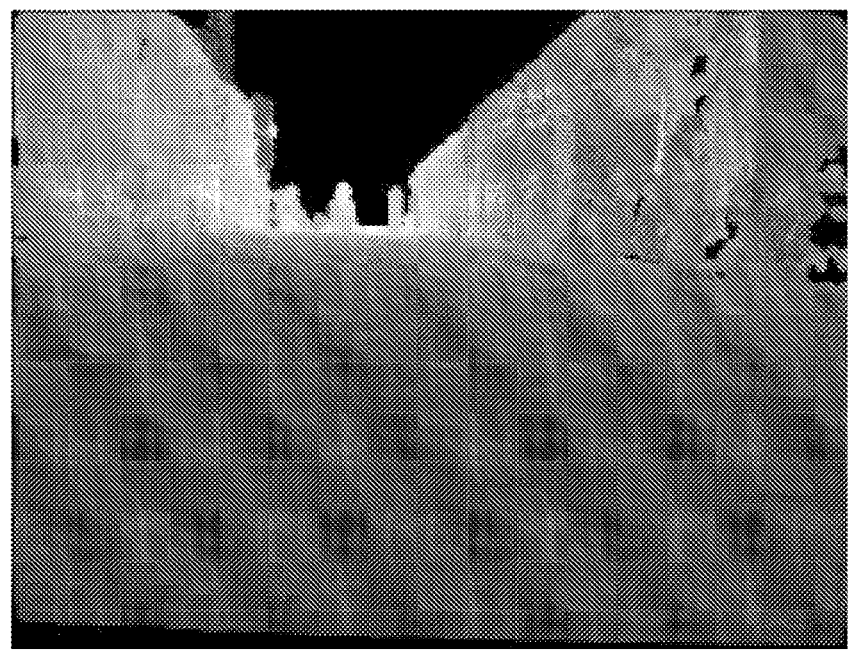
FIG. 4d shows a reprojected depth image (a second representation), corresponding to the laser intensity image of FIG. 4c, where lighter colours represent larger depths.

Using this estimated pose, the image synthesizer 132 reprojects all of the points from the 3D prior model into the frame of the cameras 104, 106 of the sensor 10 to produce a synthetic depth image. FIG. 4 shows examples of these representations: FIG. 4*a* is an example of a camera image from the sensor 100 (i.e. a first representation); FIG. 4*b* is an example of the 3D point cloud (i.e. the prior model of the locale); and FIG. 4*c* is an example of the synthesized image generated by the image synthesizer 134 (i.e. the second representation). Thus, the synthesized image (i.e. second representation) provides a substantially similar image to the image captured by the sensor at the current time (i.e. first representation) but which has been generated from the prior model of the locale.

For reasons of efficiency, the localiser 130 is arranged to restrict the size of the 3D prior model (i.e. the prior representation) that is considered by using a sliding window about the estimated position of the cameras 104, 106 within the sensor 100. Embodiments arranged in such a manner improve the speed of the system and reduce the amount of work that for the localiser 130. In the embodiment being described the window corresponded to a physical size within the prior representation of substantially 40 m. In other embodiments other window sizes may be used and for example windows sizes of substantially any of the following may be used: 20 m; 30 m; 50 m; 60 m; 70 m or the like.

Thus, for every pixel, i, in the image, the image synthesizer computes the estimated depth, $z_i$, in the local map according to the localisation estimate, $$z_i = z_i(x + \delta x), \quad \delta x \sim \mathcal{N}(0, P_x), \tag{1}$$

where $\delta x$ is normally distributed noise given by covariance $P_x$, which represents our localisation and calibration uncertainty.

Due to the sparsity and sub-pixel values of the reprojections in the image, the image synthesizer performs bilinear interpolation and then applies a median filter for smoothing Other embodiments may utilise other image processing techniques. The image synthesizer may only perform interpolations on pixels that are within a specified threshold of their reprojected neighbours. In the embodiment being described the specified threshold is to only perform interpolations on pixels that have at least one neighbour within a 4-pixel radius. In other embodiments other thresholds may be used.

As noted above, the prior representations 138 held in the memory have been preprocessed to remove ephemeral objects and as such the synthesized depth image (i.e. second representation) contains only the static/invariant/structural components of the scene.

Figure 5A:
FIG. 5a shows an image of a scene generated by a camera.
Figure 5B:
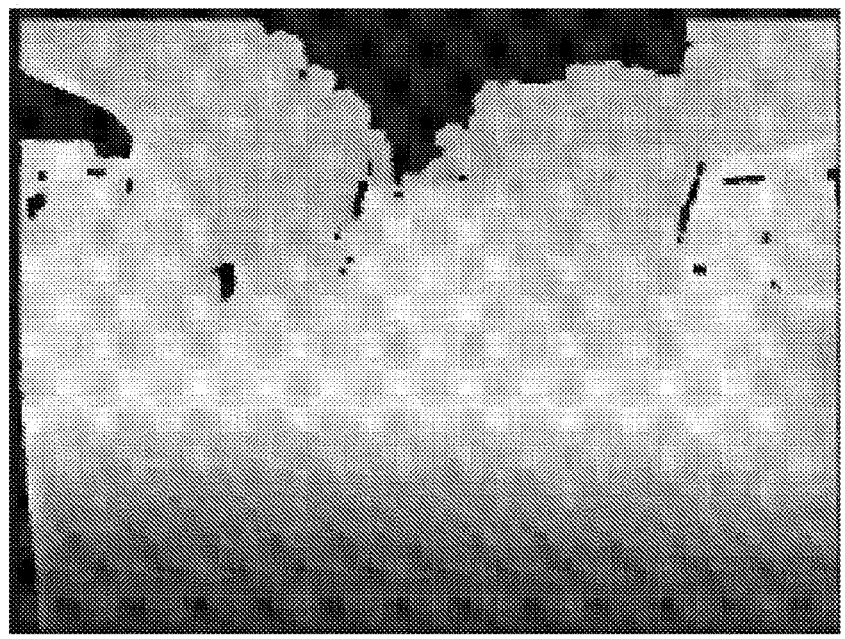
FIG. 5b shows a stereo disparity image using the method of Geiger et al. [21]

The removal of the ephemeral objects in the prior representation is exemplified with reference to FIGS. 4a and 4c where a vehicle 400 can be seen in FIG. 4a but is not evident in the second representation of FIG. 4c. Thus, assuming that the estimate of the camera pose used to generate the synthetic prior (i.e. second representation) is reasonably accurate, any discrepancies between the real (i.e. first representation) and synthetic depth images (i.e. second representation) represent ephemeral objects in the live stream. Examples of these images are shown in FIG. 5: FIG. 5a shows an image from one of the cameras of the sensor 100; FIG. 5b shows a so-called disparity image generated by the method outlined in the paper: A. Geiger, M. Roser, and R. Urtasun, "Efficient large-scale stereo matching," in *Asian Conference on Computer Vision (ACCV)*, Queenstown, New Zealand, November 2010.

Figure 5C:
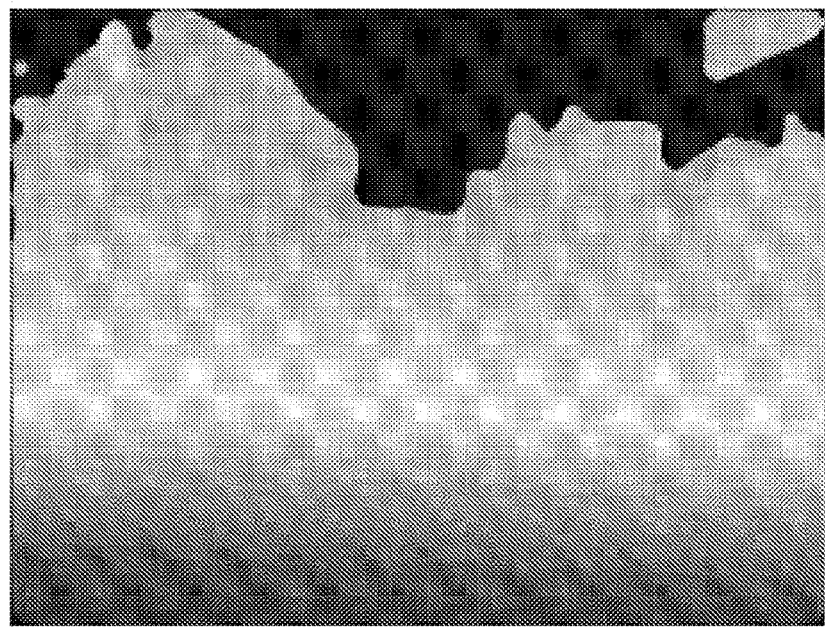
FIG. 5c shows a synthetic disparity image generated from the 3D scene prior.

FIG. 5c shows a disparity image which is generated by the image synthesizer 132.

It should be noted that the image shown in FIG. 5a, output from sensor 100, contains a number of vehicles including those at 500, 502 and 504. These vehicles are examples of ephemeral objects within the sensed scene.

In addition to the step described above, some embodiments may cause the comparator 134 to perform additional steps as described below.

Firstly, it is worth noting that calibration and/or localisation errors may lead to large disagreements in the foreground because of the inverse relationship between depth and disparity. FIG. 5d shows an image which is simply generated by a comparison of the first and second representation in the method described above and it can be seen that there is a significant amount of noise in the foreground 506. That is, noise on smaller depth values will produce large noise in disparity.

Secondly, disparity differences for distant objects will naturally be smaller, meaning that there may be advantages in amplifying these weaker signals and some embodiments may be arranged to do this.

Embodiments being described cause the localiser 130 to localise the position of the vehicle 102 against a single prior model 138. Accordingly, in such embodiments, it is not possible to learn a statistical model for the background as is done in most background subtraction methods of the prior art (i.e., we only have a single sample of the prior). However, it is conceivable that other embodiments may use more than one prior model in which case statistical models may become applicable.

Thus, in the embodiment being described, the comparator 134 is arranged to take a probabilistic approach and weight the disparity differences by their associated measurement uncertainties which are obtained from the average depth Jacobian (step 1208). For every pixel, i, in the image, we define a disparity measurement from the dense-stereo algorithm, $d^c$, and synthetic depth image, $d^s$, as follows, $$d_i^c := \bar{d}_i^c + \delta d_i^c, \tag{2}$$
$$\delta d_i^c \sim \mathcal{N}(0, \sigma_{d_i^c}^2),$$

$$d_i^s := \frac{fb}{z_i^s(x + \delta x)}, \tag{3}$$
$$\delta x \sim \mathcal{N}(0, P_x),$$

where $\delta d_i^c$ is normally distributed pixel noise with standard deviation $\sigma_d^2 c_i$, $\{f, b\}$ are the intrinsic focal length and baseline, $z_i^s(\bullet)$ is the synthetic depth produced by a map-localisation estimate, x, with normally distributed noise given by the covariance matrix $P_x$. Dropping the pixel sub-script for convenience, it is possible to define a disparity difference measurement as, $$e_d := d^c - d^s \approx \underbrace{\bar{d}^c - \bar{d}^s}_{=:\bar{e}_d} + \delta d^c + \underbrace{\frac{fb}{(z^s)^2}\left(\frac{\partial z^s}{\partial x}\right)\delta x}_{=:\delta \bar{e}_d}, \tag{4}$$

where: $\bar{z}^s := z^s(\bar{x})$, $\bar{d}^s := fb/\bar{z}^s$, and a first-order Taylor series expansion on the inverse depth term has been performed. The associated measurement noise is given by the following, $$\sigma_{e_d}^2 := E(\delta e_d \delta e_d^T) \tag{5}$$
$$= \sigma_{d^c}^2 + \frac{(fb)^2}{(z^s)^4}\left(\frac{\partial z^s}{\partial x}\right)P_x\left(\frac{\partial z^s}{\partial x}\right)^T.$$

Figure 6A:
FIG. 6a shows a Jacobian image with the camera image used to generate the Jacobian image shown inset.

The Jacobian, $\partial z^s / \partial x$, represents the change in depth that occurs given small perturbations of the vehicle's 102 pose. In view of the time that would be required to compute the Jacobian some embodiments use the following approximation. To begin, the term $Z_x$ is defined as follows:

$$Z_x := \sqrt{\left(\frac{\partial z^s}{\partial x}\right)P_x\left(\frac{\partial z^s}{\partial x}\right)^T}, \tag{6}$$

which provides an estimate of the depth change at a particular pixel location, given the localisation uncertainty. FIG. 6(a) shows an example image where $Z_x$ has been numerically computed for each pixel location (i.e., evaluating $\partial z^s/\partial x$ for each pixel). In this figure lighter regions represent areas which are more sensitive to pose change of the vehicle. Examining the image of FIG. 6a, it becomes clear that the regions with the most uncertainty occur at large depths (due to the oblique angle between the plane and the optical axis), as well as non-smooth surfaces (e.g., trees). The original image that was used to generate the main image of FIG. 6a is shown inset within the Figure.

Thus, embodiments may use an average depth Jacobian which is precomputed 144. In order to generate this precomputed Jacobian a Jacobian was averaged over 500 keyframes (i.e. over a plurality of images) from a separate dataset. In other embodiments, other number of images may be used to generate the pre-computed Jacobian 144.

Figure 6B:
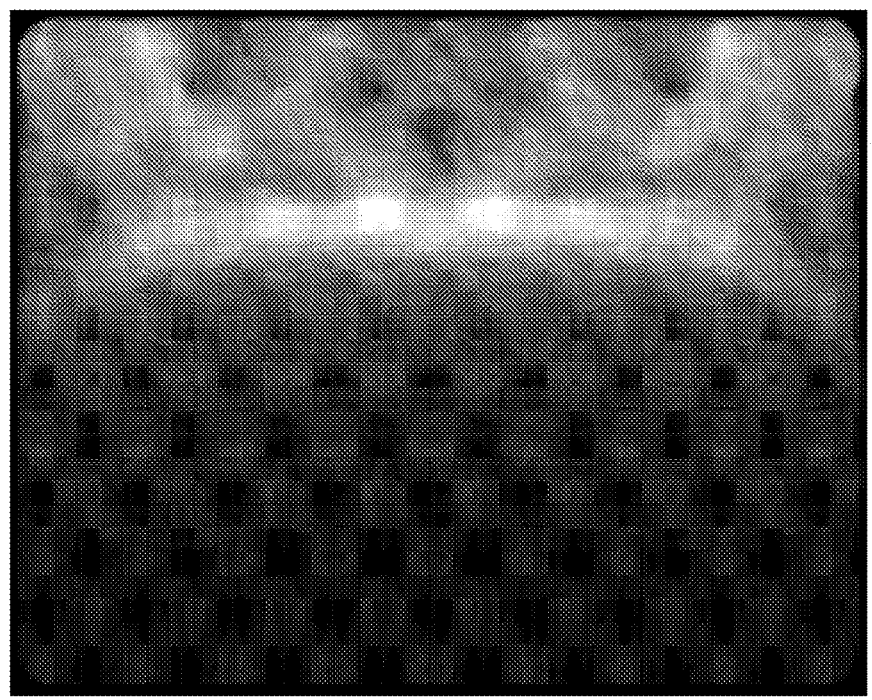
FIG. 6b shows an average depth Jacobian image produced by averaging over 500 depth Jacobian images.

This pre-computed average depth-Jacboian image 144, which may be thought of as a pre-computed filter, is shown in FIG. 6(b). It should be noted that this approximation works well because in embodiments which are operating in urban environments, where the structure of the scene remains relatively constant and there is likely to be a consistency between the images seen from the cameras within the sensor 100. Different average depth-Jacobian images may be provided for other environments. Some embodiments may apply an average depth-Jacobian image according to the location of the vehicle, or the like.

Denoting this approximation as $\hat{Z}_x$, we have $$\sigma_{e_d}^2 \approx \sigma_{d^e}^2 + \frac{(fb)^2}{(z^s)^4}\hat{Z}_x^2, \quad (7)$$

allowing us to define our Mahalanobis disparity difference measurement as, $$\tilde{e}_d := \sqrt{e_d^2/2\sigma_{e_d}^2}. \quad (8)$$

Figure 5E:
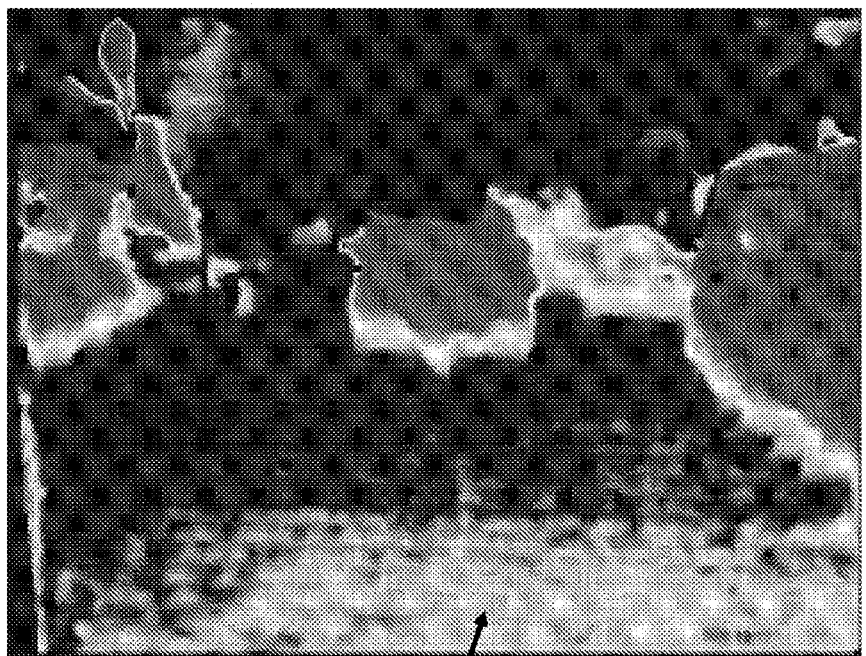
FIG. 5e shows an uncertainty-weighted disparity difference image after, in one embodiment, a max filter has used to amplify the image with subsequent smoothing using a low-pass filter.
Figure 5E:
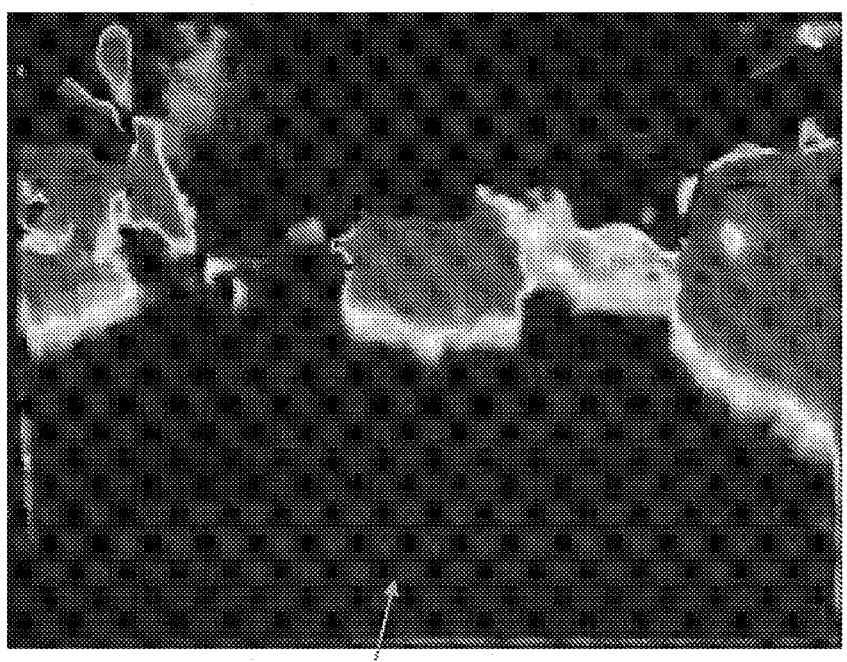

FIG. 5(e) shows the result of applying our measurement uncertainty to get the uncertainty-weighted disparity difference. It can be seen that the noise 506 that was present in the foreground of FIG. 5d has now been removed and the foreground 508 is now clearer.

Thus, an effect, in embodiments that use the precomputed Jacobian 144, is that errors in the near field are downweighted, which naturally brings out differences with objects that are farther away (i.e., the weaker signals for distant objects appear stronger since the foreground noise is reduced).

Figure 5F:
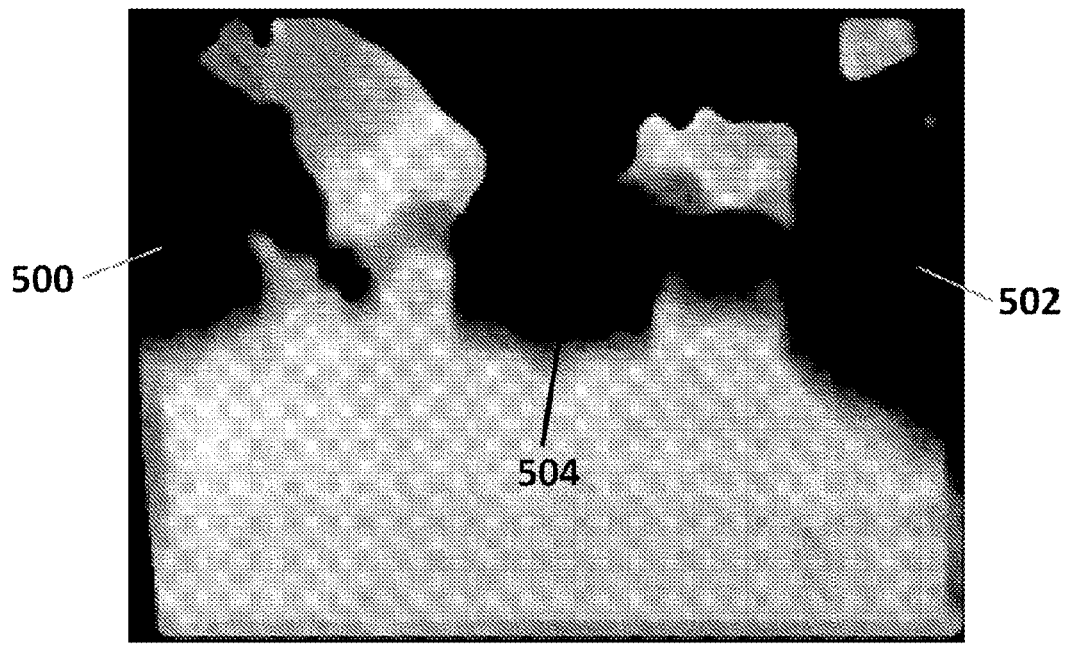
FIG. 5f shows a background likelihood image generated by an embodiment in which black indicates a likelihood of 0 and white represents a likelihood of 1.

An output from the comparator 134 may be termed a background-likelihood image which can be obtained by thresholding the uncertainty-weighted disparity as shown in FIG. 5e (i.e., set $e\tilde{d} > \tau_d = \tau_d$ for all pixels), using a max-filter to amplify the disparity disagreements, scaling the image between [0, 1], and taking the complement. Such a background-likelihood image is shown in FIG. 5f. Thus, a background likelihood is generated (step 1310) which shows features of the first representation which are thought to be parts of the structure (i.e. are background).

In FIG. 5f lighter regions represent background portions of the image (i.e. structural parts) where darker portions represent ephemeral portions of the image. Thus, it can be seen that the vehicles 500, 502 and 504 from FIG. 5a are highlighted as dark regions in FIG. 5f.

A second embodiment is now described which provides an alternative method for generating the background-likelihood image which relies on a so-called optical flow between images (the optical flow may be thought of as being the movement between portions of two images). Such an embodiment may utilise monocular images as opposed to the stereo images used in the method outlined above.

Figure 7A:
FIG. 7a shows an image of a scene generated by a camera in which the vehicles within the scene are in motion.
Figure 7B:
FIG. 7b shows a synthetic camera image generated by reprojecting a coloured point cloud into the image plane and highlights residuals over a predetermined threshold.

To create a synthetic optical flow image at time $t_k$, the synthetic depth image created from the prior model as described above and camera image at $t_{k-1}$ are used to create a point cloud, which is typically shown as a coloured point cloud within images (step 1300). The motion estimate between times $t_{k-1}$ and $t_k$, denoted by the 4×4 SE(3) transformation $T_{k, k-1}$ (Special Euclidean transformation defined in a 3D space in both translation and rotation; i.e. there is 6 degrees-of-freedom estimate of the pose of the vehicle (i.e., in x, y, z, roll, pitch, yaw), is applied and the point cloud is reprojected into the estimated camera pose at time $t_k$ to create a synthetic camera image as shown in FIG. 7 (step 1302). FIG. 7a illustrates an original image, whereas FIG. 7b shows a synthetic image generated, by the image synthesizer 134, by reprojecting the point cloud into the image plane and in this image residuals with the true camera image are highlighted. In the embodiment being described pixels having an intensity difference between the two images of over substantially five were highlighted. In other embodiments other thresholds may be used. Other embodiments, may use other thresholds and for example substantially any of the following thresholds may be suitable: 2, 3, 4, 6, 8, 10, 15, or the like. Thus, it will be seen that the image synthesizer is programmed differently to that of the first embodiment.

Regions without any data (i.e., pixel locations where the nearest reprojected point is beyond a certain distance) are filled in with the intensity values from the true camera image. This step is performed in order to ensure that a full image is created and that there is no missing data, otherwise the optical flow algorithm produces a noisy result. After reprojecting the point cloud and filling in missing regions, an interpolation is applied (which in this embodiment is bilinear), followed by a Gaussian low-pass filter to smooth the image.

Figure 8A:
FIG. 8a shows an image of a scene generated by a camera.
Figure 8B:
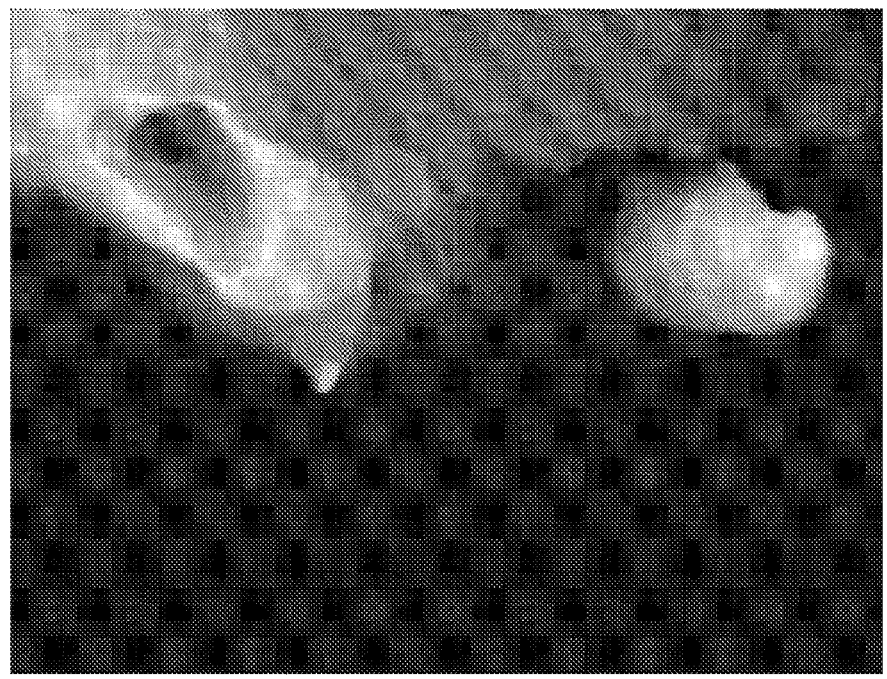
Figure 8C:
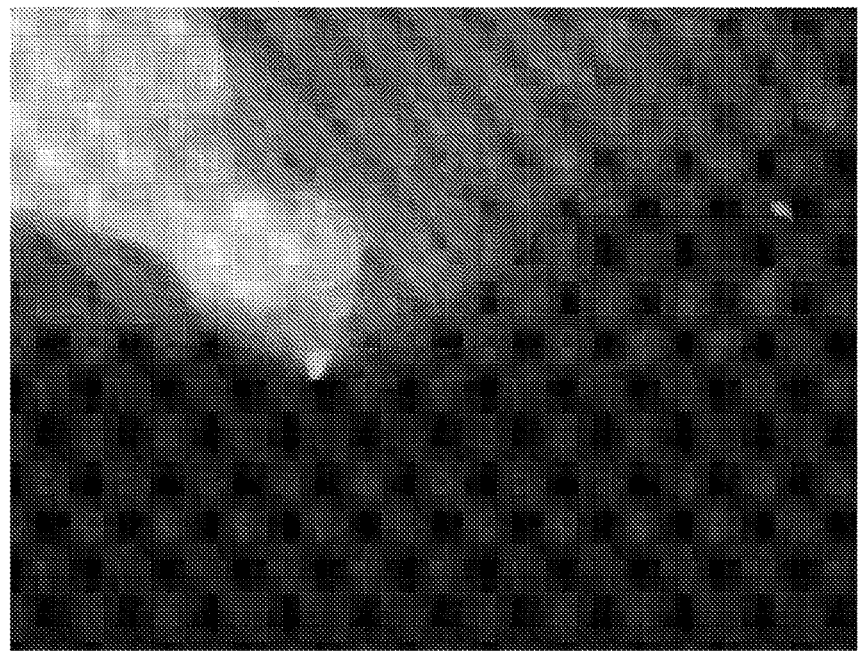
FIG. 8c shows a synthetic optical flow generated using the prior model of the scene.

Once we have generated a synthetic intensity image at time $t_k$ (step 1304), embodiments may use the method set out in C. Liu, "Beyond pixels: Exploring new representations and applications for motion analysis," Ph.D. dissertation, MIT, 2009 to compute the true optical flow that is taken between the true image at $t_{k-1}$ and the true image at $t_k$ (and the result is seen in FIG. 8b) and the expected (or synthetic) optical flow which is taken between the true image at $t_{k-1}$ and the synthetic image at $t_k$ (and the result is seen in FIG. 8c) (step 1306). FIG. 8a shows the original camera image a reference and again the presence of a number of ephemeral vehicles such as 800 and 802 should be noted. The teachings of Liu are hereby incorporated by reference and the skilled person is directed to read this teaching.

The true optical flow measurement, $f^c$, and synthetic optical flow measurement, $f^s$, for pixel i are defined as, $$f_i^c := \bar{f}_i^c + \delta f_i^c, \quad \delta f^c \sim N(0, \sigma_{f^c}^2), \quad (9)$$

$$f_i^s := f_i^s(z^s(x+\delta x)), \quad \delta x \sim N(0, P_x). \quad (10)$$

Figure 8D:
FIG. 8d shows an optical flow difference.

FIG. 8d shows the calculated optical flow difference between the true image at $t_{k-1}$ and the synthetic image at $t_k$. In a similar manner to the first embodiment, and dropping the subscript, a difference measurement and its associated un-certainty is defined as, $$e_f := f^c - f^s \qquad (11)$$

$$\approx \underbrace{\overline{f^c} - \overline{f^s}}_{=:\bar{e}_f} + \delta f^c - \underbrace{\frac{\partial f^s}{\partial z^s}\left(\frac{\partial z^s}{\partial x}\right)\delta x}_{=:\delta e_f},$$

$$\sigma_{e_f}^2 := \sigma_{f^c}^2 + \left(\frac{\partial f^s}{\partial z^s}\right)^2 \left(\frac{\partial z^s}{\partial x}\right) P_x \left(\frac{\partial z^s}{\partial x}\right)^T. \qquad (12)$$

Such a derivation introduces another Jacobian term, $\partial f^s/\partial z^s$, which represents changes in optical flow due to changes in depth. Computing this Jacobian term involves reprojecting coloured points, interpolating a grayscale image, and running it through an optical flow algorithm that computes local spatial and temporal derivatives. It is conceivable that embodiments could compute this Jacobian term, however, in the embodiment being described an approximation is performed as follows (step 1308).

The approximation uses the intuition that scaling 2D flow fields by their associated depth approximates the 3D velocity. In the embodiment being described, the difference between the expected and observed flow is scaled by the expected depth to amplify large differences:

$$\tilde{e}_f = e_f z^s. \qquad (13)$$

Figure 8E:
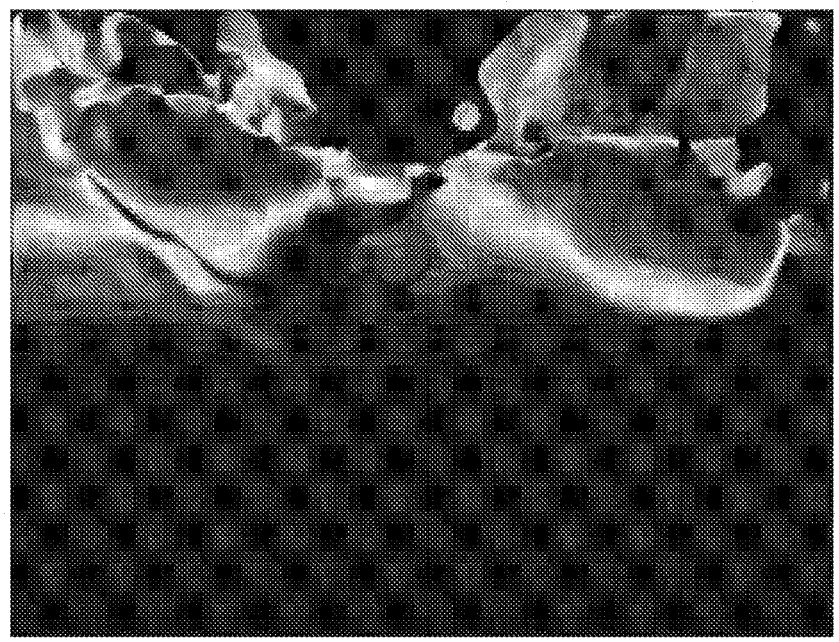
FIG. 8e shows a depth-weighted optical flow difference.
Figure 8F:
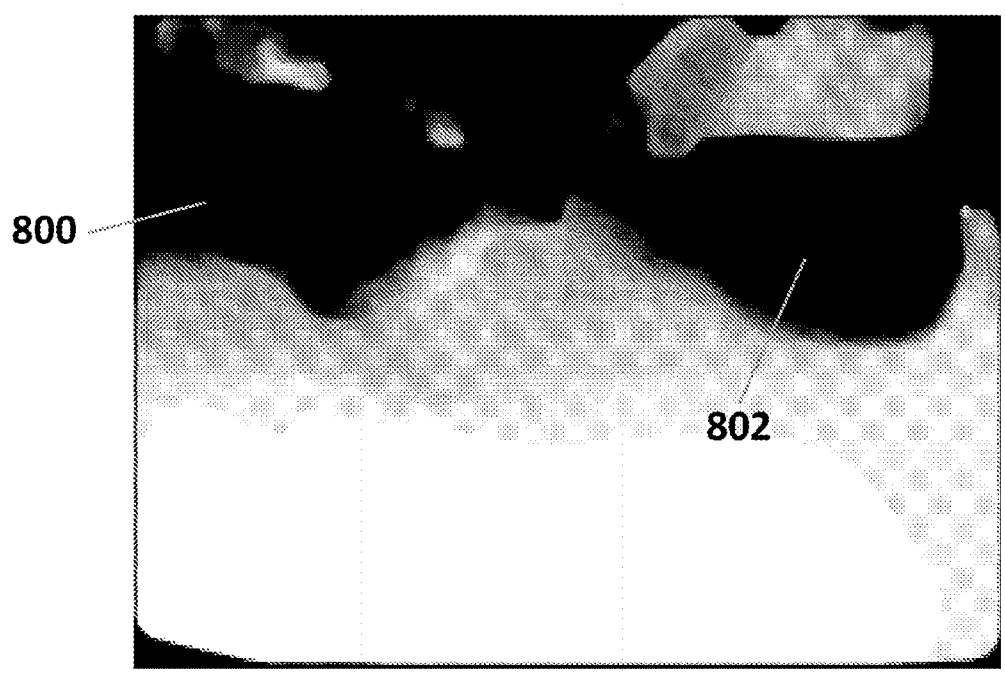
FIG. 8f shows a background likelihood image generated by a second embodiment.

Whilst this approximation does not explicitly account for uncertainties in the flow difference it was found to work well in practice and obviate the need to compute the Jacobian term thereby increasing the computational speed, etc. FIG. 8(e) shows the depth-weighted flow difference and FIG. 8(f) shows the resulting background-likelihood image, which is formed in the same manner as described earlier (i.e. by thresholding the depth-weighted optical flow difference as shown in FIG. 8e (i.e. set $ed > \tau_d - \tau_d$ for all pixels), using a max-filter to amplify the disparity disagreements, scaling the image between [0, 1], and taking the complement. (step 1310).

As with the output of the first embodiment described above, it will be seen that the background likelihood image comprises lighter regions for structural portions of the image shown in FIG. 8a and darker regions for the ephemeral portions of the image shown in FIG. 8f. Again, it will be seen that the portions representing the vehicles 800 and 802 are shown as darker portions and have therefore effectively been masked from the background.

The skilled person will appreciate that each of the two embodiments described above generate a background likelihood image highlighting areas of the original image input to the embodiment that have a high likelihood of being a structural portion thereof. This background likelihood image may find further use in further embodiment.

In one such embodiment, the background likelihood image may be used to improve the Visual Odometry (VO) front end. Initially the VO front end extracts features in the images of the stereo pair by using the FAST corner detector with a low threshold to obtain thousands of candidate features. (E. Rosten, G. Reitmayr, and T. Drummond, "Real-time video annotations for augmented reality," in *Advances in Visual Computing*, 2005).

In order to allow the method to process images in real time, the embodiment being described takes the top N features, ranked by their corner score, $s_i$ for further processing. In order to ensure that the features are well distributed spatially, the image is partitioned into a number of quadrants and the desired number of features N, is divided equally among each quadrant.

The background-likelihood images may then be used to re-weight each corner score by looking up the closest likelihood weight, $b_i$, and re-weighting according to the following $$\tilde{s}_i = \begin{cases} 0 & \text{if } b_i < \tau_b \\ b_i s_i & \text{otherwise} \end{cases}$$

where $\tau_b$ is a threshold for the minimum required likelihood. This threshold using the background-likelihood is useful because otherwise, embodiments would seek to find a minimum number of features in each quadrant, provided that the corner scores are above zero. This means that there could be a quadrant with low likelihood scores (close to zero, but not exactly zero), yet, the target number of features will still be taken since all scores have decreased by a proportional amount. Thus, the embodiment being described disregards features that are extracted in quadrants believed to belong to foreground objects. Thus, such embodiments remove outlier feature points (i.e., extracted feature points believed to be on ephemeral objects).

In the experimental data that was collected a localisation error was computed by measuring the estimated frame-to-frame pose change output from the VO system against that measured by the INS. It is believed that this was a more appropriate measure than looking at cumulative errors since an orientation error in one frame may skew the results for the rest of the trajectory. Denoting the true frame-to-frame translation as $\rho_t$ and the estimated as $\rho_e$, we define a frame-to-frame error measure as:

$$E_{xyz} := |\|\rho_e\|_2 - \|\rho_t\|_2|. \qquad (14)$$

This error measure was computed for three implementations: (i) our standard VO system using RANSAC, (ii) our disparity-based method with RANSAC (i.e. the first embodiment described above), and (iii) our flow-based method with RANSAC (i.e. the second embodiment described above). The skilled person will appreciate that RANASC (RANdom SAmple Consensus) is a standard outlier rejection technique used to estimate parameters of a model (in the case for the embodiment being described, the pose of the vehicle) based on observations (in the case for the embodiment being described, feature matches between stereo images), where it is assumed that in the set of observations, there are outliers.

Figure 9:
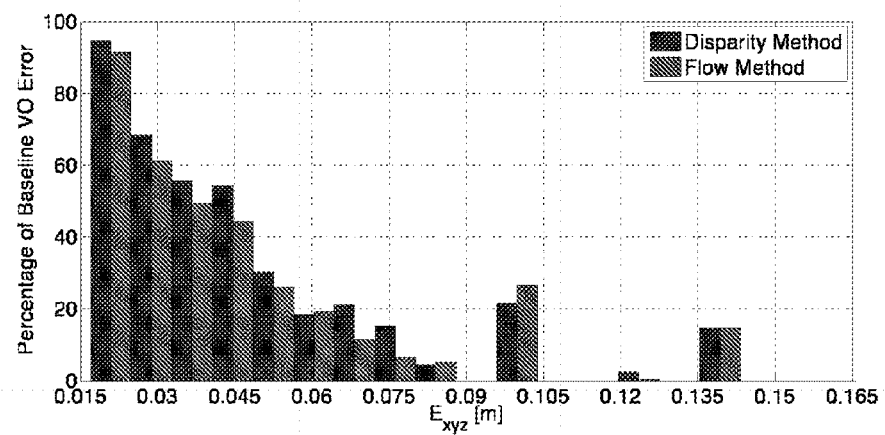
FIG. 9 shows a graph illustrating the performance of an embodiment.

To reiterate, the method used by at least some embodiments provides an extra step of outlier rejection before proceeding with RANSAC. The goal is to illustrate the improvements in VO by incorporating these likelihood images for feature reweighing. FIG. 9 shows the error percentages for our disparity-based and flow-based distraction suppression techniques against our standard VO system, where we see a noticeable improvement in accuracy.

The system parameters used in relation to FIG. 9 are shown in the following table:

TABLE I

SYSTEM PARAMETERS

| Parameter | Description | Value |
| --- | --- | --- |
| $\sigma_d^2$ | Stereo disparity noise covariance [pixels$^2$] | $0.05^2$ |
| $\tau_d$ | Mahalanobis distance threshold for the disparity-based method | 1 |
| $\tau_f$ | Depth-adjusted error threshold for the optical flow-based method | 20 |

Figure 10:
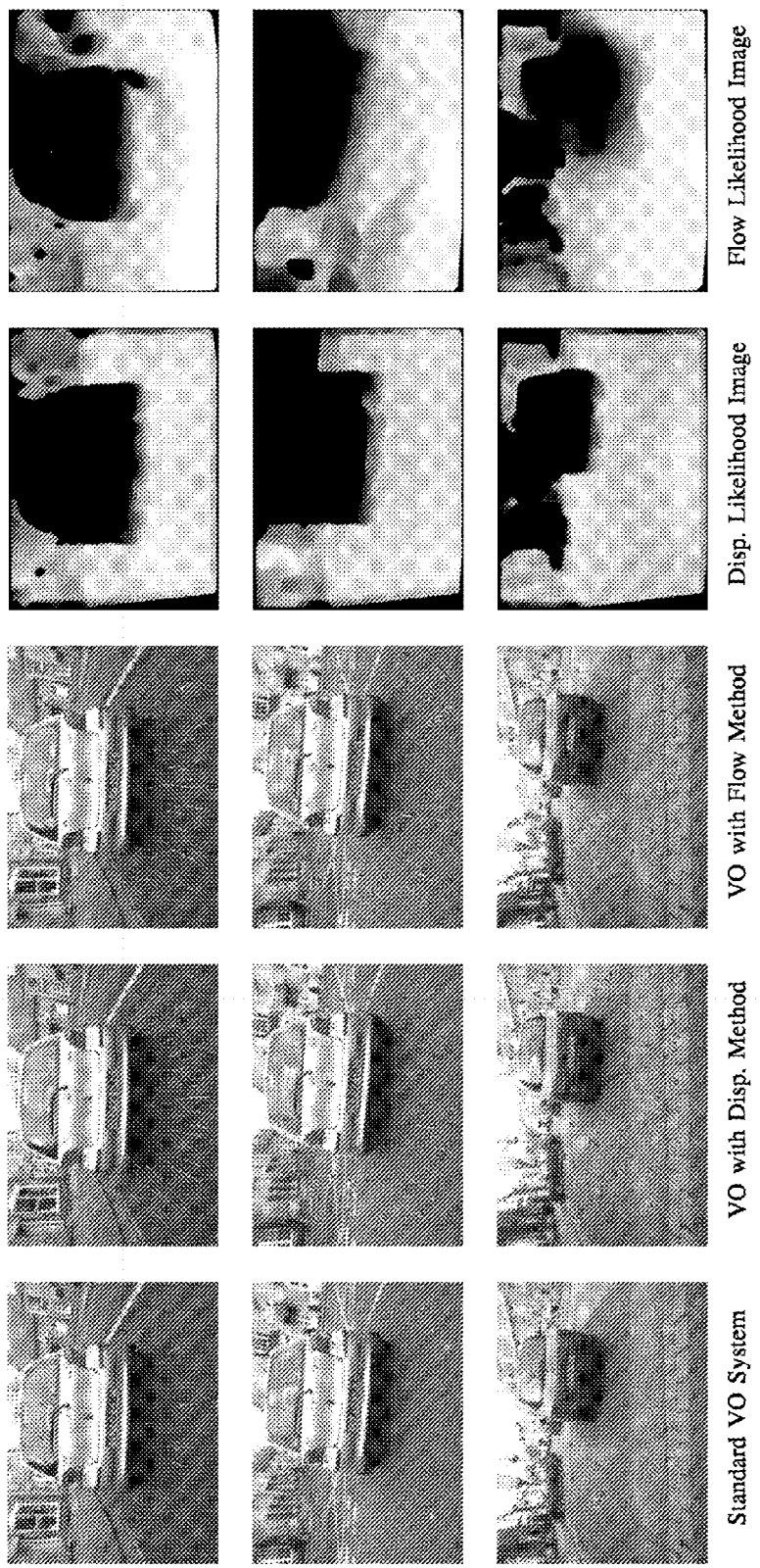
FIG. 10 shows a set of results generated from a first dataset.

A number of representative cases where the methods of the first and second embodiments out-perform the baseline are shown in FIG. 10 and occur when there are many strong candidate feature matches on moving vehicles (i.e. a number of ephemeral objects in the scene). It is noted that there are several cases where most of the scene was initially static but began moving (e.g., pulling up to traffic stopped at a red light) which would have been particularly unlikely to have been handled by prior art image processing techniques.

Referring to FIG. 10 then the top two rows showcase examples where the test vehicle was driven behind a vehicle that was initially at rest, but then began to move. As the vehicle makes up a large portion of the image and has distinctive features, the baseline system matched features on the vehicle across subsequent frames, leading to an erroneous motion estimate noted by the highlighted marks on the vehicle. In contrast, our distraction suppression systems of the first (second column from left) and second (third column from left) embodiments ignored this vehicle and produce an accurate estimate—note that there are no marks on the vehicle. The last row shows a situation where RANSAC yielded a poor initial guess and the baseline system converged to an inaccurate estimate. Once again, this was not an issue with the distraction suppression methods described above, which easily distinguished the foreground and background objects.

In a second set of results, in a dense urban environment, there were signal-strength issues which resulted in poor GPS measurements, which are not accurate enough to ground-truth our motion estimates; i.e. the INS system did not function correctly. The skilled person will appreciate that this can be a common problem in urban environments, which strengthens the case that improving the robustness of relative motion estimation (as performed by the first and second embodiments described above) can be used to improve vehicle navigation.

Figure 11:
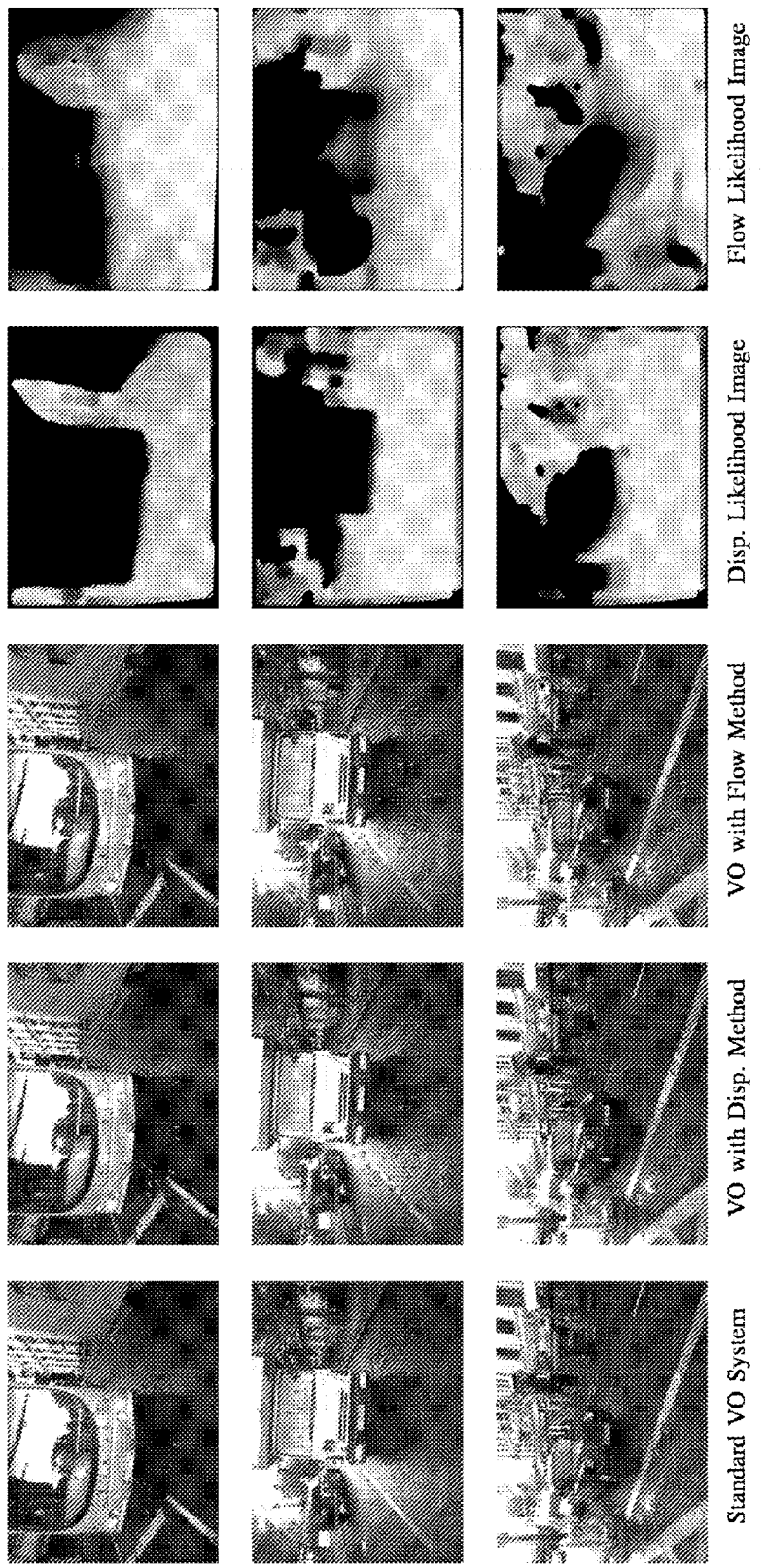
FIG. 11 shows a set of results generated from a second dataset, different from the first.

Referring to FIG. 11 then the top row illustrates an example of a large bus obscuring the image and very slowly approaching as our vehicle began to move. The baseline system tracked features on the bus instead of the road surface, leading to an incorrect motion estimate. Even though most of this image is obscured by foreground objects (i.e. the bus), the techniques outlined above were able to focus on the structural parts of the scene, resulting in more robust estimates. The bottom two rows illustrate other examples of our baseline system (i.e., without distraction suppression) incorrectly tracking features on moving vehicles and producing erroneous estimates.

The results show that both the disparity-based (i.e. the first embodiment) and flow-based (i.e. the second embodiment) methods outperformed our standard VO system with comparable results (see FIG. 9).

An observable difference between the two embodiments was with regard to how they handled stationary objects. For the flow-based method, stationary objects where only identified if the camera was in motion, otherwise, the objects would reproject to the exact same location, which would not produce a flow difference. In contrast, the disparity-based method was able to detect stationary objects regardless of whether or not the camera was in motion. However, since tracking features on stationary objects does not directly impact the performance of egomotion, these two techniques ended up performing comparably.

The skilled person will appreciate that elements of this embodiments described above may be provided in hardware, firmware or software.

The invention claimed is:

1. A method of detecting structural elements within a scene sensed by a first sensor within a locale, the method comprising:
   acquiring data from the first sensor, which data provides a first representation of the sensed scene at a current time;
   generating a second representation of the sensed scene where the second representation is generated from a prior model of the locale, the prior model of the locale generated using a second sensor different from the first sensor; and
   comparing the first and second representations with one another to determine which parts of the first representation represent structural elements of the locale, wherein comparing the first and second representations comprises generating disparity differences between the first and second representations which are weighted according to an associated measurement uncertainty.

2. A method according to claim 1 in which generating the second representation includes generating the second representation by reprojecting at least a portion of the prior model to represent the first representation.

3. A method according to claim 2 in which the prior model is processed so that the second representation includes only the structural elements and excludes ephemeral objects.

4. A method according to claim 1 in which the measurement uncertainty is provided by using a pre-computed filter.

5. A method according to claim 4 in which the pre-computed filter is an average depth-Jacobian image where $\partial z^s/\partial x$ is computed for each pixel in the following:

$$Z_x := \sqrt{\left(\frac{\partial z^s_x}{\partial x}\right) P_x \left(\frac{\partial z^s_x}{\partial x}\right)^T}.$$

6. A method according to claim 5 in which the average depth Jacobian image is computed over a plurality of frames and the results combined.

7. A method according to claim 1 in which generating the second representation includes generating the second representation using a determination of movement between a time the first representation was provided and the sensed scene was provided by the prior model.

8. A method according to claim 1 in which the method is used to localize a vehicle within a vehicle locale, the first sensor is mounted upon the vehicle, and wherein the method is applied to data obtained from the first sensor on the vehicle.

9. A method according to claim 1 wherein the first sensor and the second sensor are of different sensor modalities.

10. A method according to claim 1 wherein the first sensor is a camera and the second sensor is a laser scanner.

11. A system comprising a memory, processing circuitry, and a first sensor, the system arranged to detect structural elements within a sensed scene, wherein the system is arranged to perform the following tasks:
   acquire, using the first sensor, a first representation of a sensed scene taken at a first time;
   generate, using the processing circuitry, a second representation of the sensed scene, where the second representation is generated from a prior model of a locale containing the sensed scene, the prior model of the locale having been generated using a second sensor different from the first sensor;
   compare, using the processing circuitry, the first and second representations with one another to determine which parts of the first representation are used to determine structural elements of the locale; and generate, using the processing circuitry, disparity differences between the first and second representations which are weighted according to an associated measurement uncertainty.

12. A system according to claim 11 which is arranged to reproject at least a portion of the prior model to provide a similar view to that of the first representation.

13. A system according to claim 11 which is arranged to generate the second representation using a determination of movement between the first time that the first representation was acquired and a different time.

14. A system according to claim 11 which is arranged to weight the first and second representations by a pre-computed filter.

15. A system according to claim 11 wherein the first sensor and the second sensor are of different sensor modalities.

16. A system according to claim 11 wherein the first sensor is a camera and the second sensor is a laser scanner.

17. A non-transitory machine readable medium containing instructions which when read by a computer cause the computer to:

acquire, using a first sensor, a first representation of a scene taken at a first time;

generate a second representation of the scene, where the second representation is generated from a prior model of a locale containing the scene, the prior model of the locale generated using a second sensor different from the first sensor;

compare the first and second representations with one another to determine which parts of the first representation are used to determine structural elements of the locale; and generate disparity differences between the first and second representations which are weighted according to an associated measurement uncertainty.

18. A non-transitory machine readable medium according to claim 17 in which the measurement uncertainty is provided by using a pre-computed filter.

19. A non-transitory machine readable medium according to claim 18 in which the pre-computed filter is an average depth-Jacobian image where $\partial z^s/\partial x$ is computed for each pixel in the following:

$$Z_x := \sqrt{\left(\frac{\partial z^s}{\partial x}\right) P_x \left(\frac{\partial z^s}{\partial x}\right)^T}.$$

20. A non-transitory machine readable medium according to claim 19 in which the average depth Jacobian image is computed over a plurality of frames and the results combined.

* * * * *